(12) United States Patent
Baldi et al.

(10) Patent No.: US 10,078,743 B1
(45) Date of Patent: Sep. 18, 2018

(54) CROSS IDENTIFICATION OF USERS IN CYBER SPACE AND PHYSICAL WORLD

(71) Applicant: Narus, Inc., Sunnyvale, CA (US)

(72) Inventors: Mario Baldi, Cuneo (IT); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 0 days.

(21) Appl. No.: 14/458,723

(22) Filed: Aug. 13, 2014

Related U.S. Application Data

(63) Continuation-in-part of application No. 13/756,309, filed on Jan. 31, 2013.

(51) Int. Cl.
*G06F 17/00* (2006.01)
*G06F 21/32* (2013.01)
*G06N 99/00* (2010.01)

(52) U.S. Cl.
CPC ............ *G06F 21/32* (2013.01); *G06N 99/005* (2013.01)

(58) Field of Classification Search
None
See application file for complete search history.

(56) References Cited

U.S. PATENT DOCUMENTS

2006/0075420 A1* 4/2006 Ludvig ................. H04H 60/32
                                                              725/9
2012/0137340 A1* 5/2012 Jakobsson et al. ................ 726/1

OTHER PUBLICATIONS

Shi et al., "Implicit Authentication through Learning User Behavior", Springer-Verlag Berlin Heidelberg 2011.*
Xia, Ning et al., "Mosaic: Quantifying Privacy Leakage in Mobile Networks," SIGCOMM 2013, Aug. 12-16, 2013, Hong Kong, China.
Olejnik, Lukasz et al., "Why Johnny Can't Browse in Peace: On the Uniqueness of Web Browsing History Patterns," HOTPETS 2012.

* cited by examiner

*Primary Examiner* — Mariela Reyes
*Assistant Examiner* — Mohsen Almani
(74) *Attorney, Agent, or Firm* — Kwan & Olynick LLP

(57) ABSTRACT

A method for using a user device. The method includes obtaining, during a fingerprint learning phase, a historical portion of user activity data associated with user activity of a user using the user device, analyzing, by a computer processor of the user device, the historical portion to generate a fingerprint of the user, wherein the fingerprint represents characteristics of the user activity, obtaining, during a fingerprint matching phase subsequent to the fingerprint learning phase, an ongoing portion of the user activity data, analyzing, by the computer processor and based on the fingerprint, the ongoing portion to determine a match, wherein the match is determined at a time point within the fingerprint matching phase, and unlocking, by the computer processor and in response to determining the match, a locked data item for access, therein the locked data item is stored on the user device. The locked data item is associated to the user owning, assigned to, or normally and legitimately using the user device. In one embodiment, once unlocked the data item can be used to authenticate the user associated to it, i.e., the user owning, assigned to, or normally and legitimately using the user device on which the data item is stored.

20 Claims, 7 Drawing Sheets

CROSS IDENTIFICATION OF USERS IN
CYBER SPACE AND PHYSICAL WORLD

CROSS REFERENCE TO RELATED
APPLICATIONS

This application is a continuation-in-part application of U.S. Non-provisional patent application Ser. No. 13/756,309, entitled "Inferring User Interests From Geo-Location Reports," and filed Jan. 31, 2013.

This application is related to U.S. patent application Ser. No. 13/855,872, entitled "Categorizing Network Resources and Extracting User Interests From Network Activity," and filed Apr. 3, 2013. The entirety of the U.S. Non-provisional patent application Ser. No. 13/855,872 is incorporated herein by reference.

BACKGROUND OF THE INVENTION

As of September 2012, about 85% of American adults own a cell phone, with over half of them owning a smartphone. For the years of 2011 and 2012, the smartphone ownership increased dramatically. One difference between the smartphone and the traditional cell phone is the ability to download and use mobile applications (commonly referred to as apps) that match various interests of individual owners. As a result, the mobile apps market also experienced an explosive growth. The number of apps exceeded one million with significant (e.g., 20% or more) annual increase of apps in major online apps markets. With an average of 50 apps installed on each smartphone and a daily average of 1.4 hours spent on using the apps, the mobile apps and the app markets have become a significant part of people's daily lives.

Internet traffic offers a wealth of geo-location data that originates from a user input as well as location based services. For example, a user sends geo-coordinates to find a restaurant on Google© Maps, as well as a location-targeted advertisement (ad) sending geo-coordinates of a targeted region inside the ads' HTTP headers, etc. Among the steady influx of geo data items from diverse geo-location sources, some reports are related to point-of-interests (PoIs), while others may not correspond to interests, thus creating noise to interest extraction. Examples of such noises are geo data items originating from a user's casual swiping over Google© maps, driving on a highway, or sending weather alerts about random cities in a given state.

In today's highly computerized and interconnected world there are several instances in which people need to authenticate, i.e., proof their identity, to a computer in order to gain access to cyber or physical resources. Typical examples in the cyber space are accessing services provided by servers connected to the Internet or decrypting secure messages received through the Internet. Typical examples in the physical world are accessing restricted areas, such as an office space or a home or physical resources, such as unlocking a bicycle of a bike sharing service.

Existing methodologies are based on the possession of a unique identification token that ranges from a password, to a PIN number, to a secret or private cryptographic key, to a magnetic card, to a smartcard, to a RFID, to a pseudo random sequence generator, and/or to a combination thereof. All of these identification tokens suffer from a common weaknesses: if anyone other than the legitimate owner gets possession of the token, he/she can use it to fraudulently authenticate as the owner, thus gaining unauthorized and illegitimate access to services and resources restricted to the owner of the token.

SUMMARY

In general, in one aspect, the present invention relates to a method for using a user device. The method includes obtaining, during a fingerprint learning phase, a historical portion of user activity data associated with user activity of a user owning, assigned to, or normally and legitimately using the user device, analyzing, by a computer processor of the user device, the historical portion to generate a fingerprint of the user owning, assigned to, or normally and legitimately using the user device, wherein the fingerprint represents characteristics of the user activity, obtaining, during a fingerprint matching phase subsequent to the fingerprint learning phase, an ongoing portion of the user activity data, analyzing, by the computer processor and based on the fingerprint, the ongoing portion to determine a match, wherein the match is determined at a time point within the fingerprint matching phase, and unlocking, by the computer processor and in response to determining the match, a locked data item for access, therein the locked data item is stored on the user device. The locked data item is associated to the user owning, assigned to, or normally and legitimately using the user device. In one embodiment, once unlocked the data item can be used to authenticate the user associated to it, i.e., the user owning, assigned to, or normally and legitimately using the user device on which the data item is stored.

In general, in one aspect, the present invention relates to a user device of a user. The user device includes a processor and memory, a user activity data acquisition module comprising instructions stored in the memory, when executed on the processor having functionality to obtain, during a fingerprint learning phase, a historical portion of user activity data associated with user activity of the user using the user device, and obtain, during a fingerprint matching phase subsequent to the finger print learning phase, an ongoing portion of the user activity data, an user activity analyzer comprising instructions stored in the memory, when executed on the processor having functionality to analyze the historical portion to generate a fingerprint of the user, wherein the fingerprint represents characteristics of the user activity, and analyze, based on the fingerprint, the ongoing portion to determine a match, wherein the match is determined at a time point within the fingerprint matching phase, a authentication module comprising instructions stored in the memory, when executed on the processor having functionality to unlock, in response to determining the match, a locked data item for access, therein the locked data item is stored on the user device, and a repository for storing the user activity data, the fingerprint, and the locked data item.

In general, in one aspect, the present invention relates to a non-transitory computer readable medium embodying instructions for using a user device. The instructions when executed by a processor, of the user device, comprising functionality for obtaining, during a fingerprint learning phase, a historical portion of user activity data associated with user activity of a user using the user device, analyzing the historical portion to generate a fingerprint of the user, wherein the fingerprint represents characteristics of the user activity, obtaining, during a fingerprint matching phase subsequent to the finger print learning phase, an ongoing portion of the user activity data, analyzing, based on the fingerprint, the ongoing portion to determine a match, wherein the match is determined at a time point within the fingerprint matching phase, and unlocking, in response to determining the match, a locked data item for access, therein the locked data item is stored on the user device.

Other aspects and advantages of the invention will be apparent from the following description and the appended claims.

DETAILED DESCRIPTION

Figure 1A:
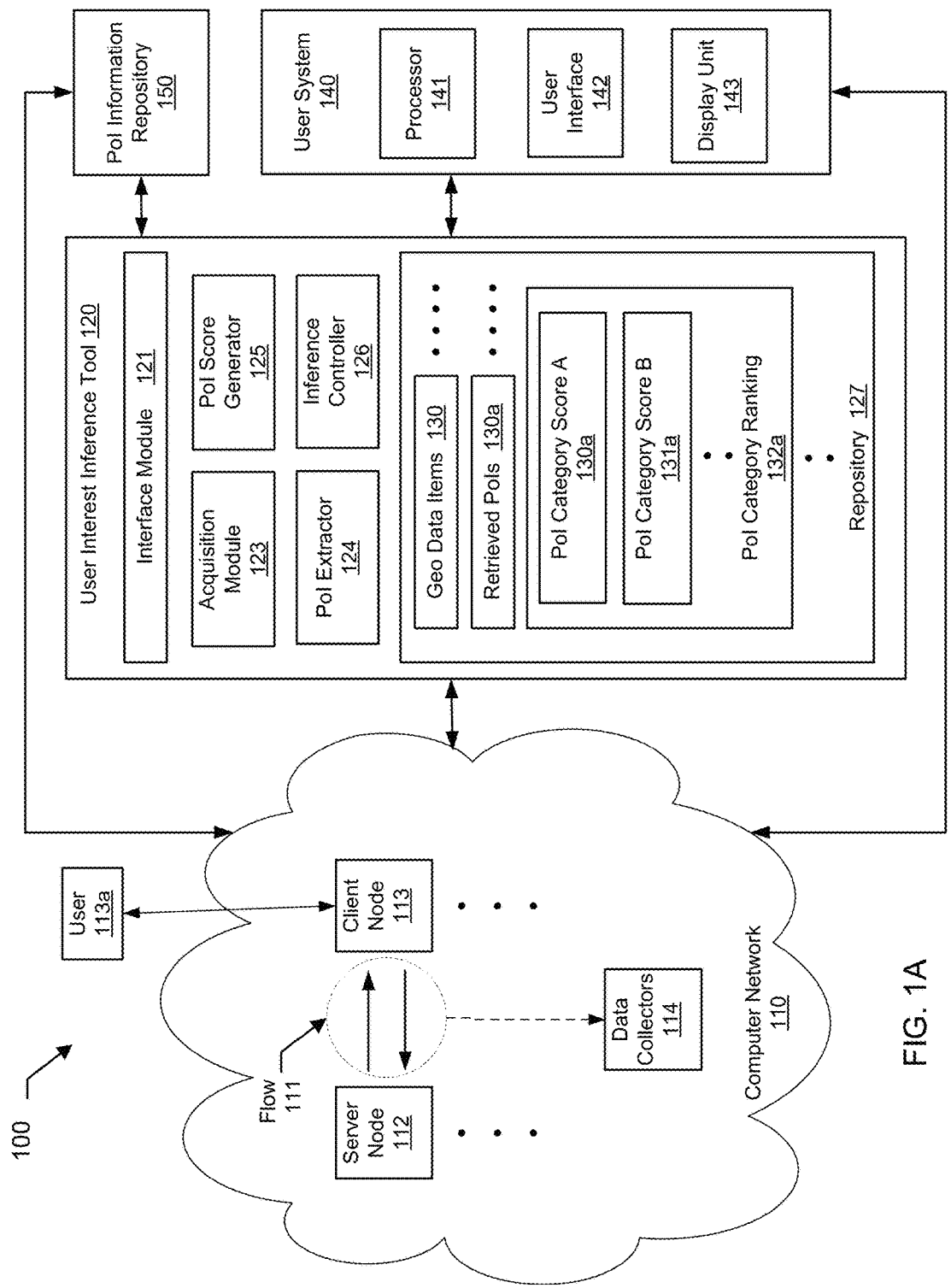
FIG. 1A shows a schematic block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention provide a system, method, and computer readable medium for managing access to a user device. For example, the user device may be accessed to provide a service or other available features. Specifically, a locked data item (e.g., authentication token) stored on the user device is locked and unusable unless the user device is proven to be in possession of the owner (i.e., a legal user or an authorized user). To this purpose, the token is embedded into an authentication module of the user device that is securely locked to an owner identification module of the user device. The secure locking of the authentication module and the owner identification module means that the two modules communicate in a secure way and the operation of the authentication module is controlled by explicit control signals generated by the owner identification module according to its operation. Specifically, the owner identification module monitors the cyber and/or physical activity of the owner in order to extract features describing various aspects of such activity and creates a fingerprint that is unique to the owner of the identification token in the locked data item and thereafter uses such fingerprint to identify the owner based on such activity. The authentication module and the owner identification module form a Cyber-Physical (Cy-Phy) authentication system. Only when the fingerprint-based identification enables the owner identification module to confirm that the user currently using the device is the owner of the identification token in the locked data item, the owner identification module sends a secure control signal to the authentication module to activate the identification. Only upon reception of a positive activation control message does the authentication module unlock the locked data item and use the information within to authenticate the user of the device, who, thanks to the above described operation of the owner identification module, is known to be the owner of the locked data item and the information within. Possible hosts for the Cy-Phy authentication system are devices with computational power and possibly different types of sensors, that the owner carries most of the time and possibly uses to communicate through the Internet. Typical examples are smartphones, tablets, smart bracelets, smart vehicles, laptops. When embedded in such devices, the owner identification module monitors various types of activities of the user that include Internet browsing activities, e-mail exchanges, deployment of applications, acceleration data (when the device is equipped with an accelerometer), position (when the device is equipped with a global positioning system (GPS) receiver), temperature, humidity, light, images of the surroundings (when the device is equipped with a camera), noise (when the device is equipped with a microphone), biometric data (e.g., heartbeat rate, body temperature, blood pressure, skin humidity). Features for the creation of fingerprints may be derived from all of the above Cy-Phy activities and combined to create fingerprints that uniquely identify the person in possession of the device. A match with the fingerprints of the legitimate owner allows the identification module to ensure that the device is in the owner's possession. Such matching is continually performed. Whenever the user attempts to prove his/her identity through the authentication module, the authentication token is unlocked and accessible only if the identification module confirms that the last user fingerprint verified matches the one of the legitimate owner of the identification token.

Throughout this disclosure, the term "flow" refers to a sequence of packets exchanged between two network nodes, referred to as a source and a destination of the flow where the source or the destination may be the originator of the exchange. Generally, in an IP network, such as the Internet, a flow is identified by a 5-tuple of <source IP address, destination IP address, source port, destination port, protocol> where the payload of the flow may be represented by a string of alphanumeric characters and other sequences of bits.

Generally, the term "flow" may refer to a unidirectional flow or a bi-directional flow. A unidirectional flow includes only data packets traveling in one direction, either from server node to client node or vice versa. A bi-directional flow includes data packets traveling in both directions from server node to client node, and vice versa. The originator of the flow may be the server node or the client node. A bi-directional flow includes a combination of two unidirectional flows traveling in opposite directions. In one or more embodiments, a bi-directional flow is analyzed by analyzing two unidirectional flows separately. Analyzing the network traffic based on unidirectional flows provides a solution to the routing asymmetry at the Internet backbone, where one direction of a flow is often missing. Using unidirectional flows allows the user interest inference tool to be deployed anywhere in the network.

In one or more embodiments, the term "geo-coordinates" refers to a pair of numerical values indicating latitude and longitude of a physical location or area. In addition, the terms "geo report," "geo location report," "geo-coordinate report," and "geo data item" may be used interchangeably and refer to an instance of geo-coordinates found in Internet traffic. Further, the term "geo-location data" refers to data containing one or more geo reports. In other words, geo-location data comprises one or more geo data item, while a geo data item identifies a geo-location based on at least one geo-coordinate.

A point of interest, or PoI, is a specific point location that someone may find useful or interesting. While a PoI may refer to any location that offers specific activity (e.g., sailing) or business type (e.g., a beach restaurant or marina). Most consumers use the term when referring to hotels, campsites, fuel stations or any other categories used in modern (automotive) navigation systems. In one or more embodiments, a PoI specifies, at minimum, the latitude and longitude of the location based on a certain map datum. A name or description is usually attached to a PoI.

In one or more embodiments, interests of individual users are used as features to generate fingerprints of the users. The interests of individual users are identified based on observations of the users' geo-coordinate reports as well as associations of such reports to potential points of interest (PoI). In one or more embodiments, identifying the user interest is based on passive observations of Internet traffic (usually containing the traffic originating from numerous users). Generally, association (i.e., having a geo-coordinate report pointing to nearby location near the PoI) of a user to a PoI may indicate evidence that the user physically visited the PoI or identifying that the user inquired about the PoI (e.g., the user's web search resulting in a geo-coordinate report that may relate to the PoI). In one or more embodiments, as noted above, the term "PoI" refers to any location that offers specific activity (e.g., sailing) or business type (e.g., a beach restaurant or marina). In one or more embodiments, the term "user interest" or "interest of a user" refers to any attribute common to a set of the user's PoIs. For example, identifying that a user visited several Starbucks© stores and a Peet's© Coffee store may generate several potential user interests such as "beverages", "coffee", "coffee house", "Starbucks", "Peet's Coffee", etc.

Generally, observations of geo-coordinate reports alone are not sufficient to infer user interests due to a number of uncertain factors: (i) user interests may not be identified due to coarse-grained or missing reports of geo-coordinates; (ii) the reports may originate from services that are not related to any interest; (iii) the reports may be related to services that target interests of general population instead of the observed user; (iv) it is generally challenging to distinguish between the reports referring to the user's current location and other remote locations that may be of interest to the user. These uncertainties related to geo reports in Internet traffic result in noisy geo-location data. In one or more embodiments, accuracy of the reported geo data, temporal patterns indicating recurrence of reported locations, report grouping and collocation with reports of other users, and semantics associated with the reports (e.g., which service generated the geo-report) are analyzed to infer user interest from noisy geo-location data.

FIG. 1A shows a diagram of a system (100) for inferring user interest from geo data items in accordance with one or more embodiments. In one or more embodiments of the invention, one or more of the components shown in FIG. 1A may be omitted, repeated, and/or partitioned in a different manner. Accordingly, embodiments of the invention should not be considered limited to the specific arrangements of components shown in FIG. 1A.

As shown in FIG. 1A, the system (100) includes a user interest inference tool (120), a PoI information repository, a user system (140), and a computer network (110). The user interest inference tool (120) includes data repository (127), one or more application interfaces (121), an acquisition module (123), a PoI extractor (124), a PoI score generator (125), and an inference controller (126). The user system (140) includes a processor (141), a user interface (142), and a display unit (143). The computer network (110) may include cellular communications network or other mobile communications network, wired and/or wireless portions of the Internet, wide area networks (WANs), local area networks (LANs), etc.

Further, the computer network (110) includes network nodes (e.g., server node (112), client node (113), data collectors (114), etc.), which are the devices configured with computing and communication capabilities for executing applications in the network (110). As shown in FIG. 1A, the server node (112) and client node (113) communicate with each other by exchanging data packets forming a flow (111), which includes two unidirectional flows represented by two arrows. Although shown as a bi-directional flow in the example depicted in FIG. 1A, the flow (111) may also be a single unidirectional flow in other examples. In one or more embodiments, the server node (112) and the client node (113) exchange data packets in the flow (111) as a result of an application executing on the server node (112) and the client node (113). In this context, the flow (111) is referred to as being generated by the application executing on the server node (112) and client node (113). In one or more embodiments, the client node (113) may be a mobile device, such as a smartphone, a tablet computer, a hand held gaming device, etc., used by a user (113a) (e.g., an individual). In such embodiments, the application may be referred to as a mobile application, mobile app, or app. For example, the application may include a location aware application, or may be used by the user (113a) to access a location aware service. In such example, the flow (111) may include one or more geo data item identifying a location, such as a physical location where the user (113a) is or has been, or a remote location of interest to the user (113a). In one or more embodiments, certain device(s) (e.g., data collectors (114)) within the computer network (110) may be configured to collect network data (e.g., flow (111)) for providing to the user interest inference tool (120). Each of these components is described below. One of ordinary skill in the art will appreciate that embodiments are not limited to the configuration shown in FIG. 1A.

In one or more embodiments of the invention, the user interest inference tool (120) is configured to interact with the computer network (110) using one or more of the application interface(s) (121). The interface module (121) may be configured to receive data (e.g., flow (111)) from the computer network (110) and/or store received data to the data repository (127). Such network data captured over a time period (e.g., an hour, a day, a week, etc.) is referred to as a trace or network trace. Network trace contains network traffic data related to communications between nodes in the computer network (110). For example, the network trace may be captured on a routine basis using the data collectors (114) and selectively sent to the interface module (121) to be formatted and stored in the repository (127) for analysis. For example, the data collectors (114) may be a packet analyzer, network analyzer, protocol analyzer, sniffer, netflow device, semantic traffic analyzer (STA), or other types of data collection devices that intercept and log data traffic passing over the computer network (110) or a portion thereof. In one or more embodiments, the data collectors (114) may be deployed in the computer network (110) by a network communication service provider (e.g., ISP), a network security service provider, a cellular service provider (CSP) or other business or government entities. The data collector (114) may be configured to capture and provide network trace to the interface module (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the user interest inference tool (120).

In one or more embodiments, the PoI information repository (150) is a third party source of PoI information, such as Foursquare©, Google© Maps API, Bing©, etc. For example, Foursquare© is a location-based social networking website for mobile devices, such as smartphones. In one or more embodiments, the PoI information repository (150) is included in the user interest inference tool (120), for example as part of the repository (127). In such embodiments, the PoI information stored in the PoI information repository (150) is previously collected by an operator of the user interest inference tool (120) and/or updated on an ongoing basis.

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the user interest inference tool (120). The user may include, but is not limited to, an individual, a group, an organization, or some other entity having authority and/or responsibility to access the user interest inference tool (120). Specifically, the context of the term "user" (e.g., referred to as an analyst user) here is distinct from that of a user (e.g., user (113a)) of the computer network (110) or a user (e.g., user (113a)) of the application executing on the sever node (112) and the client node (113). The user system (140) may be, or may contain a form of, an internet-based communication device that is capable of communicating with the interface module (121) of the user interest inference tool (120). Alternatively, in one or more embodiments, the user interest inference tool (120) may be part of the user system (140). The user system (140) may correspond to, but is not limited to, a workstation, a desktop computer, a laptop computer, or other user computing device. In one or more embodiments, the user interest inference tool (120) may be part of the client node (113). The client node (113) may correspond to, but is not limited to, a smartphone, a tablet computer, a smart bracelet, a smart vehicle, a laptop computer, a hand held gaming device, etc. that is equipped with an accelerometer, a GPS receiver, a camera, a microphone, and/or a biometric sensor. In such embodiments, the geo data items (130) may include geo-location information obtained/generated by the embedded GPS receiver. In one or more embodiments, the user interest inference tool (120), the client node (113), and the user system (140) are integrated together. In such embodiments, the user (113a) of the client node (113) is also the user of the user interest inference tool (120) and the user system (140).

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the user interest inference tool (120) (e.g., report, alert, etc.), including intermediate and/or final results of the signature set selection process.

As shown, communication links are provided between the user interest inference tool (120), the computer network (110), the PoI information repository (150), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired, wireless, and a sequence of links separated by intermediate systems routing data units. In one or more embodiments, the user interest inference tool (120), the user system (140), the PoI information repository (150), and the communication links may be part of the computer network (110).

In one or more embodiments, a central processing unit (CPU, not shown) of the user interest inference tool (120) is configured (e.g., programmed) to execute instructions to operate the components of the user interest inference tool (120). In one or more embodiments, the memory (not shown) of the user interest inference tool (120) is configured to store software instructions for analyzing the network trace to infer user interest. The memory may be one of a variety of memory devices, including but not limited to random access memory (RAM), read-only memory (ROM), cache memory, and flash memory. The memory may be further configured to serve as back-up storage for information stored in the data repository (127).

The user interest inference tool (120) may include one or more system computers, which may be implemented as a server or any conventional computing system having a hardware processor. However, those skilled in the art will appreciate that implementations of various technologies described herein may be practiced in other computer system configurations known to those skilled in the art.

In one or more embodiments, the user interest inference tool (120) is configured to obtain and store data in the data repository (127). In one or more embodiments, the data repository (127) is a persistent storage device (or set of devices) and is configured to receive data from the computer network (110) using the interface module (121). The data repository (127) is also configured to deliver working data to, and receive working data from, the acquisition module (123), PoI extractor (124), PoI score generator (125), and inference controller (126). The data repository (127) may be a data store (e.g., a database, a file system, one or more data structures configured in a memory, some other medium for storing data, or any suitable combination thereof), which may include information (e.g., geo data items (130), PoI category ranking (132a), etc.) related to inferring user interest. The data repository (127) may be a device internal to the user interest inference tool (120). Alternatively, the data repository (127) may be an external storage device operatively connected to the user interest inference tool (120).

In one or more embodiments, the user interest inference tool (120) is configured to interact with the user system (140) using the interface module (121). The interface module (121) may be configured to receive data and/or instruction(s) from the user system (140). The interface module (121) may also be configured to deliver information and/or instruction(s) to the user system (140). In one or more embodiments, the user interest inference tool (120) is configured to support various data formats provided by the user system (140).

In one or more embodiments, the user interest inference tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple) for flow reconstruction and for accumulating multiple flows (e.g., flow (111)) to form the network trace. Although not explicitly shown FIG. 1A, such network trace may be stored in the repository (127). As note above, when the user (113a) uses a location aware application or using an application to access a location aware service, the network trace may include one or more geo data items associated with the user (113a).

In one or more embodiments, a flow parser (e.g., acquisition module (123) in conjunction with data collectors (114)) reconstructs (e.g., eliminates redundant packets, collates packets into a correct sequence, etc.) all the packets that correspond to the same traffic flow identified by the aforementioned 5-tuple. In one or more embodiments, the flows are captured and parsed throughout a pre-configured time interval recurring on a periodic basis (e.g., every minute, hourly, daily, etc.) or triggered in response to an event.

In one or more embodiments of the invention, the user interest inference tool (120) includes the PoI extractor (124) that is configured to extract one or more geo data items associated with the user (113a) from one or more flows (e.g., flow (111)) in the network trace, or from geo-location information obtained/generated by an embedded GPS receiver. As noted above, the user (113a) may be a mobile user using a smartphone, such as the client node (113) executing a location aware application or used to access a location aware service. For example, the flow (111) may include one or more geo data items associated with a physical location where the user (113a) is or has been, or a remote location of interest for the user (113a). Extracted geo data items associated with the user (113a) are then stored in the repository (127) as the geo data items (130). An example of the geo data items (130) that includes two geo data items (e.g., geo data item A (160a) and geo data item B (160b)) is illustrated in an example geographic map depicted in FIG. 1B below.

Figure 1B:
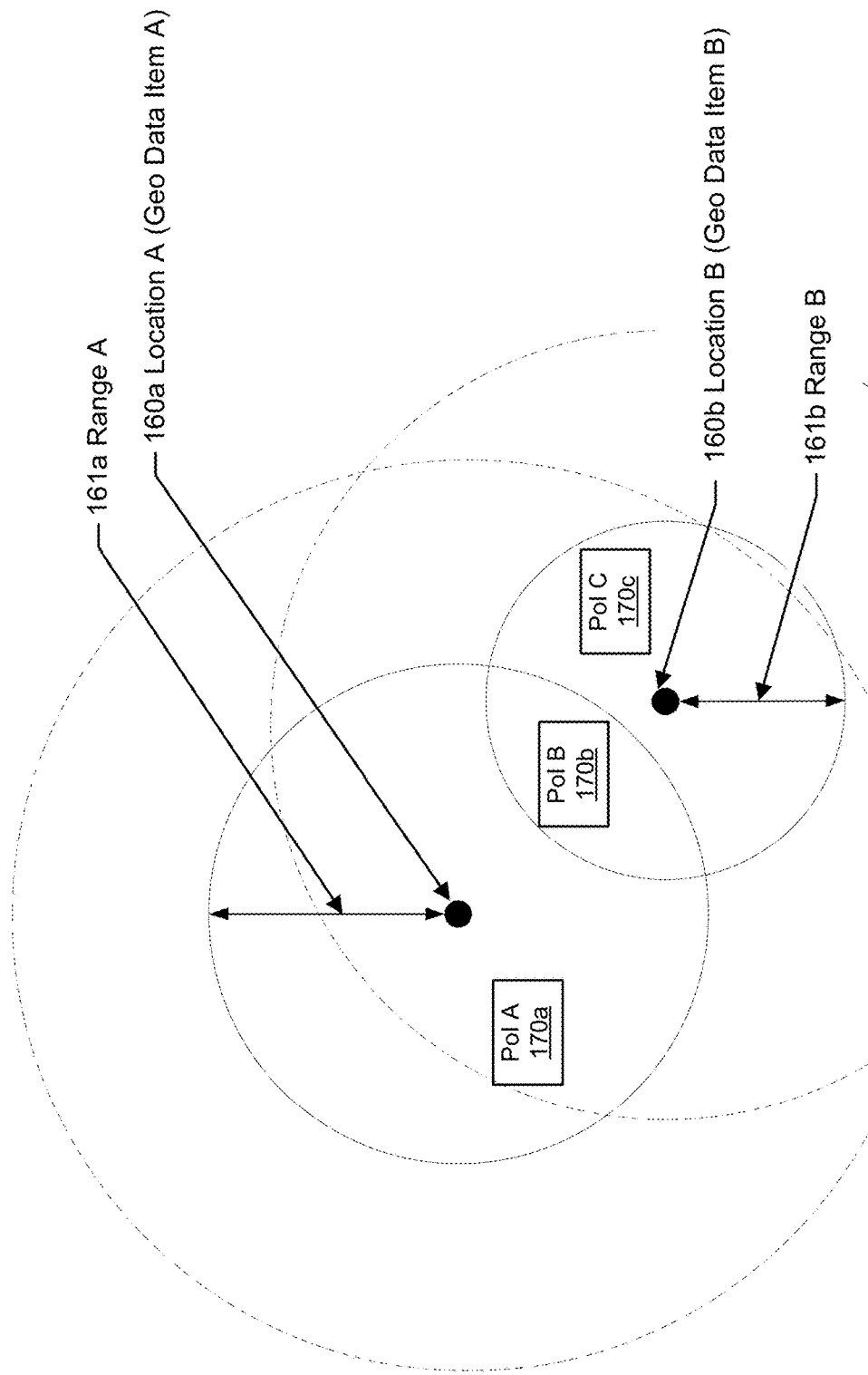
FIG. 1B shows a system block diagram according to aspects of the invention.

FIG. 1B shows an example geographic map having a location A (160a) and a location B (160b) that are identified by the geo data item A (160a) and the geo data item B (160b), respectively. In one or more embodiments, the geo data item A (160a) and geo data item B (160b) are associated with a range A (161a) and a range B (161b), respectively. In the example shown in FIG. 1B, the PoI information repository (150) includes the PoI A (170a), PoI B (170b), PoI C (170c), among others. In particular, the PoI A (170a) is within the range A (161a) from the location A (160a), PoI B (170b) is within the range A (161a) from the location A (160a) as well as within the range B (161b) from the location B (160b), and PoI C (170c) is within the range B (161b) from the location B (160b). In one or more embodiments, the range A (161a) is determined based on a precision measure of the geo data item A (160a). Similarly, the range B (161b) is determined based on the precision measure of the geo data item B (160b). In one or more embodiments, the precision measure is based on a digitization truncation error range of representing real world longitude and/or latitude using geo-coordinates having fixed number of digits. For example, the geo-coordinate "45.718672" has a digitization truncation error range of 0.000001.

Returning to the discussion of FIG. 1A, the PoI extractor (124) is further configured to retrieve PoIs associated with the user (113a) from the PoI information repository (150) based on the geo data items (130). In one or more embodiments, any PoI within a range associated with a geo data item of the geo data items (130) is retrieved from the PoI information repository (150). Retrieved PoIs are then stored in the repository (127) as the retrieved PoIs (130a) associated with the user (113a). For example as shown in FIG. 1B, the PoI A (170a) and PoI B (170b) are retrieved from the PoI information repository (150) based on the geo data item A (160a). Similarly, the PoI B (170b) and PoI C (170c) are retrieved from the PoI information repository (150) based on the geo data item B (160b). Accordingly, in this example, the retrieved PoIs (130a) includes the PoI A (170a), PoI B (170b), and PoI C (170c). In one or more embodiments, the PoI extractor (124) is further configured to include a PoI in the retrieved PoIs (130a) or discard a PoI from being included in the retrieved PoIs (130a) based on a persistency measure of the geo data item, a semantic analysis result of the network traffic flow containing the geo data item, and/or a proximity measure of the geo data item with respect to a previously identified geo data item.

In one or more embodiments of the invention, the user interest inference tool (120) includes the PoI score generator (125) that is configured to generate, based on a pre-determined criterion, a weighted count of a retrieved PoI for each geo data item (e.g., one of the geo data items (130)) associated with the PoI. In one or more embodiments, each weighted count is weighted based on an attribute of the geo data item associated with the PoI. In one or more embodiments, the attribute may include one or more of precision, accuracy, range, context, proximity to other PoIs, a timestamp, etc. of the geo data item. In one or more embodiments, the PoI score generator (125) is further configured to aggregate the weighted count across all such geo data items (e.g., each geo data item of the geo data items (130)) to generate a score of the PoI associated with the user (113a). In particular, the score of the PoI represents a potential level of interest of the user (113a) in an aspect of the PoI. In one or more embodiments, multiple scores of multiple PoIs form a score vector of the user (113a). Further, the PoIs may be arranged in a sequence of increasing (or decreasing) scores to form a PoI ranking.

In one or more embodiments, the range associated with a geo data item is used as the attribute to determine the weighting of the PoI count for the geo data item. For example, the weighting may be inversely proportional to the range. As shown in FIG. 1B, assuming the range A (161a) is twice the range B (161b), each of the weighted counts of PoI A (170a) and PoI B (170b) for the geo data item A is 0.5, while each of the weighted counts of PoI B (170b) and PoI C (170c) for the geo data item B is 1. Accordingly, by aggregating the weighted count across the geo data item A (160a) and the geo data item B (160b), a score vector of [0.5, 1.5, 1.0] is generated that represents potential levels of interest (in vector form) of the user (113a) for PoI A (170a), PoI B (170b), PoI C (170c). Specifically, the user's relative interest levels for PoI A (170a), PoI B (170b), PoI C (170c) are 0.5, 1.5, and 1.0, respectively. Further, the PoI ranking of the retrieved PoIs (130*a*) is <PoI A (170*a*), PoI C (170*c*), PoI B (170*b*)> based on the scores of 0.5, 1.0, and 1.5, respectively.

In one or more embodiments of the invention, the user interest inference tool (120) includes the inference controller (126) that is configured to adjust various parameters, settings, thresholds, etc. of the PoI extractor (124) and/or the PoI score generator (125) such that the score of one or more PoI can be statistically differentiated among all of retrieved PoIs (130*a*) associated with the user (113*a*). Accordingly, the interest of the user (113*a*) is inferred based on differentiated scores of the retrieved PoIs (130*a*) associated with the user (113*a*).

In one or more embodiments, the ranges of the geo data item may be expanded or contracted by the inference controller (126) to increase a score differentiation measure of the score vector to meet certain pre-determined criterion. For example as shown in FIG. 1B, if each of the rang A (161*a*) and range B (161*b*) is expanded by a factor of 2 (shown as enclosed by the dashed circles) to include all three PoIs, each of the weighted counts of PoI A (170*a*), PoI B (170*b*), and PoI C (170*c*) for the geo data item A is 0.5, while each of the weighted counts of PoI A (170*a*), PoI B (170*b*), and PoI C (170*c*) for the geo data item B is 1. Accordingly, by aggregating the weighted count across the geo data item A (160*a*) and the geo data item B (160*b*), a score vector of [1.5, 1.5, 1.5] is generated. Comparing to the score vector without expanding the ranges, the new score vector [1.5, 1.5, 1.5] has a lower score differentiation measure since all PoIs have the same score. In one or more embodiments, the score differentiation measure is based on a ratio between the highest score and the second highest score in the vector. In other embodiments, other statistical measure may also be used to represent a level of differentiation among all scores in the score vector.

In one or more embodiments, dependency of score weighting on the range is configured by the inference controller (126) to increase a score differentiation measure of the score vector to meet certain pre-determined criterion. For example, the dependency may be linear, quadratic, exponential, etc., as configured by the inference controller (126).

In one or more embodiments, a PoI in the PoI information repository (150) is associated with a hierarchy of categories where each level in the hierarchy has a different granularity. In such embodiments, the hierarchy level of the retrieved PoI may be configured by the inference controller (126) to increase a score differentiation measure of the score vector to meet certain pre-determined criterion. For example, for a coffee shop location identified by a geo data item, the PoI retrieved from the PoI information repository (150) may be "Starbucks© at 1200 Stevens Creek Blvd, Cupertino," Starbucks©, "artisan café," "coffee shop," "beverage store," etc. In the context when the hierarchy level of the PoI category is configured, the score of the PoI A (170*a*) is referred to as PoI category score A (130*a*), the score of the PoI B (170*a*) is referred to as PoI category score B (130*b*), and the PoI ranking of the retrieved PoIs (130*a*) is referred to as the PoI category ranking (132*a*). Similarly, a score vector is referred to as a category score vector. For example, the category score vector at a lower category hierarchy level may be [1, 1, 1] for Starbucks©, Peet's©, and Marios' grocery store with practically no score differentiation. However, when the inference controller (126) adjusts the category hierarchy level, the category score vector becomes [2,1] for coffee house (e.g., Starbucks©, Peets©) and grocery store (i.e., Marios' grocery store), which has a higher category score differentiation measure. In one or more embodiments, the category score differentiation measure is based on a ratio between the highest category score and the second highest category score in the category score vector. In other embodiments, other statistical measure may also be used to represent a level of differentiation among all category scores in the category score vector.

In one or more embodiments, the geo data item is associated with a time stamp. In such embodiments, each PoI in the retrieved PoIs (130*a*) may be filtered by requiring the time stamp of the corresponding geo data item (based on which the PoI is retrieved) to match a recurring time interval. In such embodiments, the recurring time interval for retrieving the PoI may be configured by the inference controller (126) to increase a score differentiation measure of the score vector to meet certain pre-determined criterion. For example, the PoI may be retrieved from the PoI information repository (150) only an associated geo data item has a time stamp matching "10-11 am every Monday morning," "every morning," "every Monday," "every other Tuesday," "last day of each month," etc. as configured by the inference controller (126).

In one or more embodiments, multiple users exist and an additional set of geo data items, separate from the geo data items (130), is extracted from the network trace for each additional user. Accordingly, additional set of retrieved PoIs, separate from the retrieved PoIs (130*a*), is retrieved from the PoI information repository (150) for each additional user. Further, additional PoI category ranking, separate from the PoI category ranking (132*a*) is generated for each additional user.

Additional rules, or configuring parameters thereof, for retrieving PoIs, and generating PoI score or PoI category score by the user interest inference tool (120) are described in reference to FIG. 2 below. While specific components are depicted and/or described for use in the units and/or modules of the user interest inference tool (120), it will be appreciated that a variety of components with various functions may be used to provide the formatting, processing, utility and coordination functions necessary to modify various working data used by the user interest inference tool (120). The components may have combined functionalities and may be implemented as software, hardware, firmware, or combinations thereof.

Figure 1C:
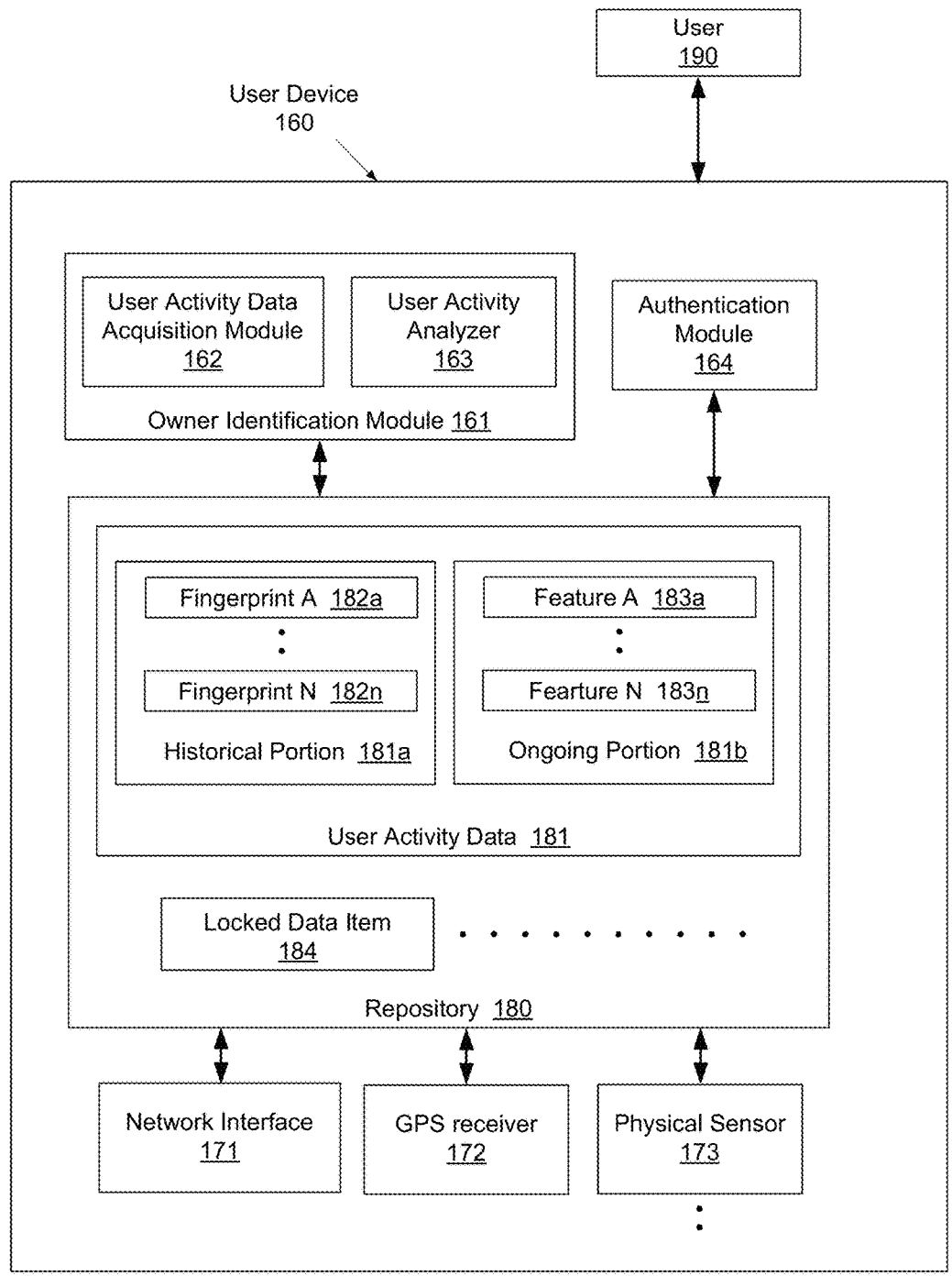
FIG. 1C shows a schematic block diagram according to aspects of the invention.

FIG. 1C shows a system block diagram of a user device (160) in accordance with one or more embodiments of the invention. Those skilled in the art, having the benefit of this detailed description, will appreciate the components shown in FIG. 1C may differ among embodiments of the invention, and that one or more of the components may be optional. Although specific numbers of components are shown in FIG. 1C, different number of each component may be included. In one or more embodiments of the invention, one or more of the components shown in FIG. 1C may be omitted, repeated, supplemented, and/or otherwise modified from that shown in FIG. 1C. Accordingly, the specific arrangement of components shown in FIG. 1C should not be construed as limiting the scope of the invention.

As shown in FIG. 1C, the user device (160) is used by a user (190) and includes an owner identification module (161), an authentication module (164), a network interface (171), a GPS receiver (172), one or more physical sensors (e.g., physical sensor (173)), and a repository (180) storing user activity data (181). Further, the owner identification module (161) includes the user activity data acquisition module (162) and the user activity analyzer (163). In one or more embodiments, the user device (160) is an example of the client node (113), as depicted in FIG. 1A above, of which the user interest inference tool (120) is a part of. Specifically, the user interest inference tool (120), depicted in FIG. 1A, may be part of the owner identification module (161) and the repository (180). Further, the user (190) is an individual person, essentially the same as the user (114a) depicted in FIG. 1A above. In one or more embodiments, the user device (160) may be a smartphone, a tablet computer, a smart bracelet, a smart vehicle, a laptop computer, a hand held gaming device, or other mobile device equipped with computing and networking capabilities. In addition to the components explicitly shown in FIG. 1C, the user device (160) also includes other typical components of these various types of mobile devices.

In one or more embodiments, the user activity data acquisition module (162) is a software component including instructions executable by a processor (not shown) of the user device (160). In particular, the user activity data acquisition module (162), when executed by the processor, includes functionality to obtain, during a fingerprint learning phase, a historical portion of user activity data associated with user activity of the user (e.g., user (190)) using the user device (160). In one or more embodiments, the historical portion of user activity data is stored in the repository (180) as the historical portion (181a) of the user activity data (181). The user activity data acquisition module (162), when executed by the processor, further includes functionality to obtain, during a fingerprint matching phase subsequent to the finger print learning phase, an ongoing portion of the user activity data. In one or more embodiments, the ongoing portion of user activity data is stored in the repository (180) as the ongoing portion (181b) of the user activity data (181).

In one or more embodiments, the user activity data (181) includes network traffic data, such as Internet browsing data, email data, and/or network application deployment data. Specifically, the network traffic data corresponds to cyber activities of the user (190) and is exchanged between the client node (113) (i.e., user device (160)) and other nodes in the computer network (110) depicted in FIG. 1A. In one or more embodiments, the user device (160) transmits and received the network traffic data via the network interface (171), which may include any network interface component known to one skilled in the art that is capable of interfacing with the computer network (110).

In one or more embodiments, the user activity data (181) includes the physical activity data, such as acceleration data, geo-location data, audio data, and/or biometric data. Specifically, the physical activity data corresponds to physical activities of the user (190) and is obtained via the GPS receiver (172) and/or the physical sensor (173), etc. For example, the physical sensor (173) may include or be a part of an accelerometer, a camera, a microphone, a biometric sensor, and/or any other sensor known to one skilled in the art that is capable of capturing data representing physical activities of the user (190).

In one or more embodiments, the user activity analyzer (163) is a software component including instructions executable by a processor (not shown) of the user device (160). In particular, the user activity analyzer (163), when executed by the processor, includes functionality to analyze the historical portion (181a) to generate a fingerprint (e.g., fingerprint A (182a), fingerprint N (182n)) of the user (190), where the fingerprint represents characteristics of the user activity of the user (190) using the user device (160). In one or more embodiments, the user activity analyzer (163) is configured to extract features (not shown) from the historical portion (181a) and in turn to generate the fingerprint from the extracted features. In such embodiments, generating the fingerprint includes analyzing the features to determine a uniqueness measure and a persistence measure of the user activity of the user (190). In particular, the uniqueness measure and the persistence measure represent the level of uniqueness and persistence of the features for representing user activity of the user (190). In one or more embodiments, the features include statistical features, and the uniqueness measure and the persistence measure includes a statistical uniqueness measure and a statistical persistence measure. Example features include a user identifier, a domain name of an accessed server, a universal resource locator (URL) of an accessed web service, a network application identifier, a geo-location report, a point-of-interest (POI) name, an online social network (OSN) message, etc. Additional examples of extracting features and generating fingerprint therefrom are described in reference to FIG. 3 below.

Figure 2A:
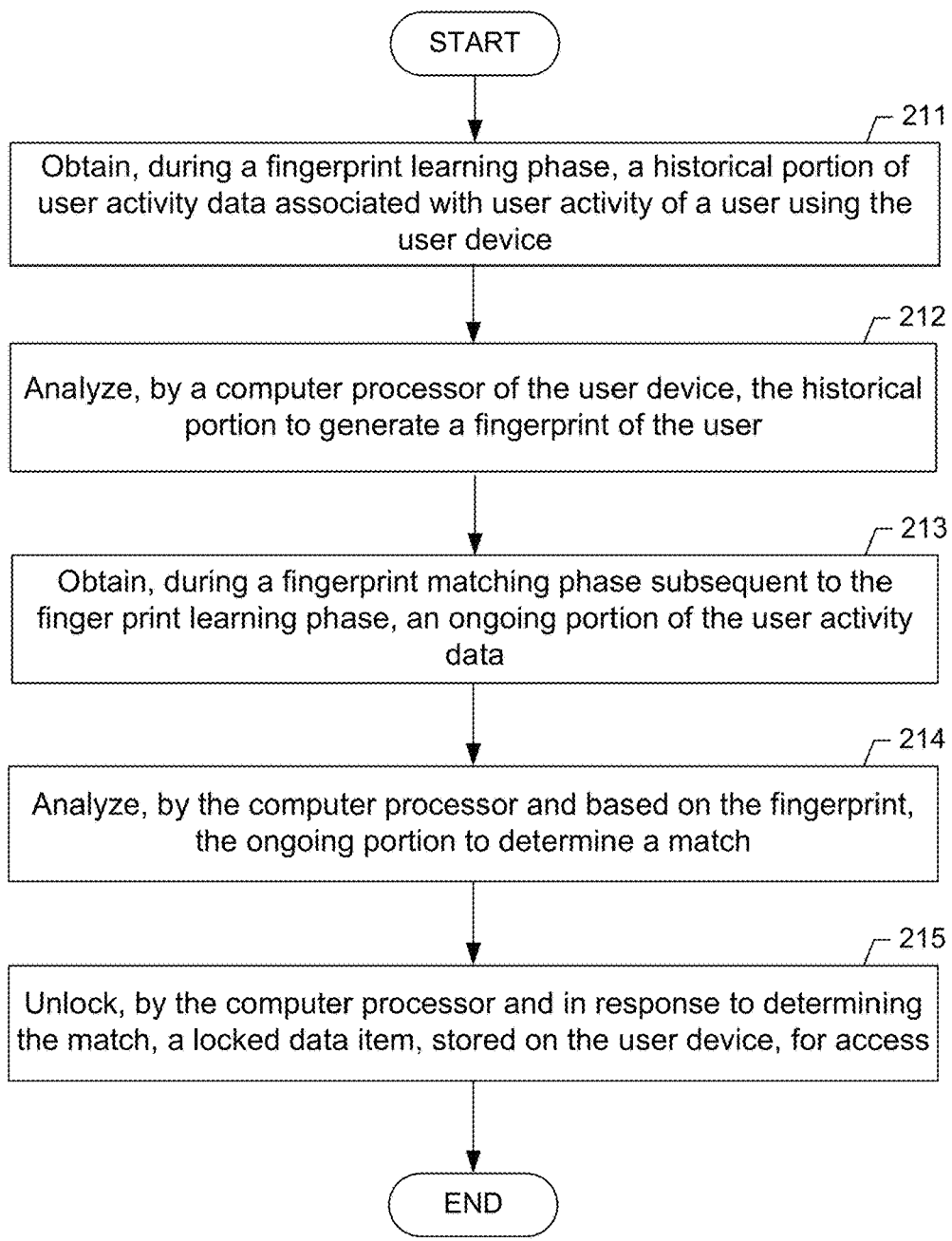
FIG. 2A shows a flowchart of a method according to aspects of the invention.
Figure 2B:
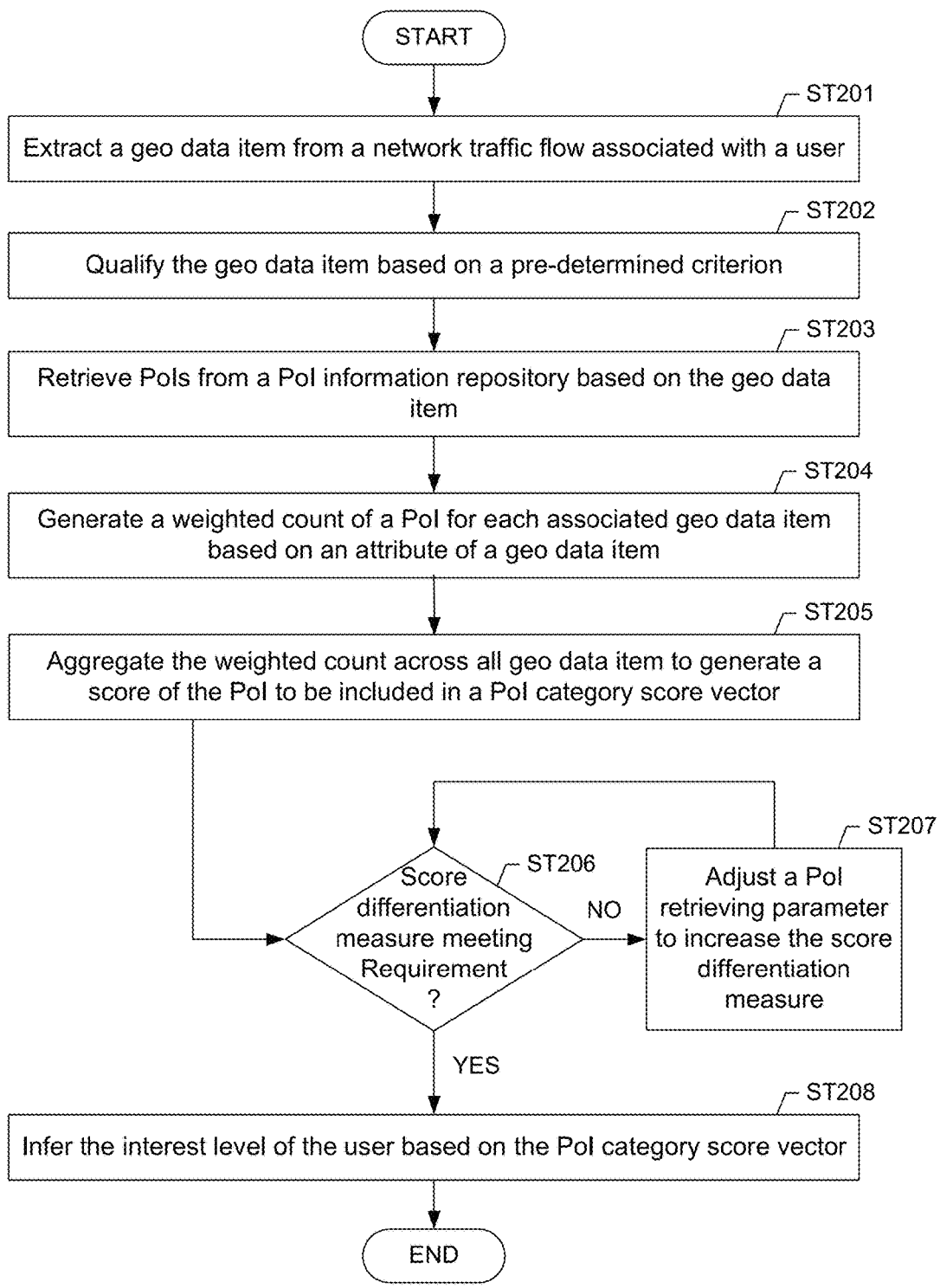
FIG. 2B shows a flowchart of a method according to aspects of the invention.

In one or more embodiments, the user activity analyzer (163) includes functionality to infer user interest as described in reference to FIGS. 1A and 2B. Accordingly, the inferred user interest is included in the features for generating the fingerprint. For example, the features may include the category score vector described in reference to FIG. 1A and FIG. 2B below.

In one or more embodiments, the user activity analyzer (163) includes functionality to infer user interest as described in reference to FIGS. 1A and 2B of the related U.S. patent application Ser. No. 13/855,872, which is incorporated herein by reference. Accordingly, the inferred user interest is included in the features for generating the fingerprint. For example, the features may include category score vector described in reference to FIG. 1A and FIG. 2 of the incorporated U.S. patent application Ser. No. 13/855,872.

In one or more embodiments, the user activity analyzer (163) is further configured to analyze, based on the fingerprint (e.g., fingerprint A (182a), fingerprint N (182n)) of the user (190), the ongoing portion (181b) to determine whether a match is found. In particular, the match is determined at a time point within the fingerprint matching phase. In one or more embodiments, the user activity analyzer (163) extracts features (e.g., feature A (183a), feature N (183n)) from the ongoing portion (181b) for comparing to the fingerprint (e.g., fingerprint A (182a), fingerprint N (182n)) of the user (190). Similar to the features extracted from the historical portion (181a), examples of feature A (183a) and feature N (183n) include a user identifier, a domain name of an accessed server, a universal resource locator (URL) of an accessed web service, a network application identifier, a geo-location report, a point-of-interest (POI) name, an online social network (OSN) message, etc. Additional details of comparing fingerprints of the historical portion (181a) and features of the ongoing portion (181b) to determine a match are described in reference to FIG. 3 below.

In one or more embodiments, the authentication module (164) is a software component including instructions executable by the processor (not shown) of the user device (160). In particular, the authentication module (164), when executed by the processor, includes functionality to unlock, in response to determining the match, a locked data item (e.g., locked data item (184)) for access. In one or more embodiments, the locked data item (184) is an authentication credential of the user (190). For example, authentication credential may be a password, a credit card number, etc. that may be accessed by a client software (not shown) installed on the user device (160). In one example scenario, the client software may use the password (i.e., locked data item (184)) to perform a user log-in that allows the user (190) to use a service provided by a network application or a network resource via the computer network (110) depicted in FIG. 1A above. In another example scenario, the client software may use the credit card number (i.e., locked data item (184)) to complete a point-of-sale transaction, which may be associated with a physical store or a online store.

In one or more embodiments, the locked data item (184) is among multiple locked data items stored on the user device (160) where each of these locked data items belongs to one of a number of authorized users of the user device (160). In particular, each of these authorized users corresponds to a portion of the user activity data (181). Accordingly, a fingerprint is generated from each portion of the user activity data (181) for a corresponding authorized user of the user device (160), thereby using it to authenticate and consequently allow any of the authorized users to access the corresponding locked data item.

Although the locked data item (184) is shown as separate from the authentication module (164), in one or more embodiments, the locked data item (184) is embedded in the authentication module (164).

FIG. 2A depicts a flowchart of a method in accordance with one or more embodiments of the invention. In one or more embodiments of the invention, one or more of the steps shown in FIG. 2A may be omitted, repeated, and/or performed in a different order. Accordingly, embodiments of the invention should not be considered limited to the specific arrangements of steps shown in FIG. 2A. In one or more embodiments of the invention, the method depicted in FIG. 2A may be practiced using the system (100) and the user device (160) described with respect to FIGS. 1A and 1C above.

Initially in Step 211, during a fingerprint learning phase, a historical portion of user activity data associated with user activity of a user using a user device is obtained. During the fingerprint learning phase, the user device is known to be in possession of a legal owner of the user device. In one or more embodiments, the historical portion of the user activity data is characteristic of user's cyber and physical activity using the user device during the fingerprint learning phase. In one or more embodiments, the user activity data includes network traffic flows, sent and/or received by the user device, as well as physical activity data captured using physical sensors on the user device. Examples of the user activity data are described in reference to FIG. 1C and FIG. 3.

In Step 212, the historical portion of the user activity data is analyzed by a computer processor of the user device to generate a fingerprint of the user. Specifically, the fingerprint represents characteristics of cyber and/or physical user activity using the user device. In one or more embodiments, statistical features are extracted from the historical portion of the user activity data and analyzed to determine a uniqueness measure and a persistence measure. Specifically, the uniqueness measure and the persistence measure represents the degree of uniqueness and the degree of persistence for each statistical feature in identifying cyber and/or physical activity of the user. In one or more embodiments, the features include a user identifier, a domain name of an accessed server, a universal resource locator (URL) of an accessed web service, a network application identifier, a geo-location report, a point-of-interest (POI) name, and/or an online social network (OSN) message. Additional examples of the features are described in reference to FIG. 3 below.

In Step 213, during a fingerprint matching phase, an ongoing portion of the user activity data is obtained. In one or more embodiments, the fingerprint matching phase is subsequent to the fingerprint learning phase. During the fingerprint matching phase, the possession of the user device is not explicitly known. In other words, the user device may not be in possession of the legal owner of the user device, i.e., someone other than the legal owner may be in possession of the user device.

In Step 214, based on the fingerprint, the ongoing portion of the user activity data is analyzed to determine whether there is a match. In particular, the match is determined at a time point within fingerprint matching phase.

In Step 215, in response to determining that a match exists between the fingerprint and the ongoing portion of the user activity data, it is confirmed that the user device is still in the possession of the legal owner. Accordingly, a locked data item stored on the user device is unlocked for access. As noted above, the authentication credential may be a password, a credit card number, etc. that may be accessed by a client software (not shown) installed on the user device. In one example scenario, the client software may use the password to perform a user log-in that allows the user to use a service provided by a network application or a network resource. In another example scenario, the client software may use the credit card number to complete a point-of-sale transaction, which may be associated with a physical store or a online store.

In a different scenario, a mismatch between the fingerprint and the ongoing portion of the user activity data is determined. In other words, it is determined that the fingerprint and the ongoing portion of the user activity data do not match each other. In response to determining that the mismatch exists between the fingerprint and the ongoing portion of the user activity data, it is confirmed that the ongoing portion of the user activity data is associated with a different user than the legal owner of the user device. In other words, the user device is no longer in the possession of the legal owner. Accordingly, the locked data item stored on the user device remains locked and is prevented for any access initiated by this different user. As noted above, the authentication credential may be a password, a credit card number, an identifier, a secret key, etc. that may be accessed by a client software (not shown) installed on the user device. In one example scenario, the client software is prevented from using the password to perform a user log-in thereby disallowing this different user to use a service provided by a network application or a network resource. In another example scenario, the client software is prevented from using the credit card number to complete any point-of-sale transaction associated with this different user. In yet another example scenario, the client software is prevented from using the identifier or the secret key to drive a near field communication device to authenticate the user with a controlled access gate, consequently preventing this different user from gaining physical access to a room, passage, or other physical resource.

FIG. 2B depicts a flowchart of method in accordance with one or more embodiments of the invention. In one or more embodiments of the invention, one or more of the steps shown in FIG. 2B may be omitted, repeated, and/or performed in a different order. Accordingly, embodiments of the invention should not be considered limited to the specific arrangements of steps shown in FIG. 2B. In one or more embodiments of the invention, the methods depicted in FIG. 2B may be practiced using the system (100) and the user device (160) described with respect to FIGS. 1A and 1C above.

Initially in Step 201, a geo data item is extracted from a network traffic flow associated with a user. For example a shown in FIG. 1A, the user may be the user (113*a*) using a smartphone (e.g., client node (113)), the network traffic flow may be the flow (111), and the geo data item may be extracted as one of the geo data items (130). In one or more embodiments, the extraction is based on observation and traffic parsing of geo data items in Internet traffic. For example, such parsing may be performed by creating regular expressions that point to traffic markers which indicate geo-locations, and to exact the corresponding geo-location coordinates. For example, one such traffic marker is "dloc=" pointing to a geo data item (41.2006406, −93.8460647) in the following Internet traffic excerpt:

rtb.nexage.com/exchange/rtb/ad/
8a8094?dcountry=USA&dmake=Motorola&dos=
Android&dloc=41.2006406%2C-
93.8460647&ukeywords=gaming The corresponding regular expression that identifies such geo data item and extracts corresponding geo coordinates is: "dloc=([0-9.]+)%2C([0-9.-]+)".

In Step 202, the geo data item is qualified based on one or more criteria. In one or more embodiments, the geo data item is retained in a set of validated geo data items based on one or more of a persistency measure of the geo data item, a semantic analysis result of the network traffic flow containing the geo data item, and a proximity measure of the geo data item with respect to a previously identified geo data item. For example, the geo data items may be classified into three classes:

(A) Reports indicating actual locations/areas visited by the observed users, (B) Reports indicating users' interests in remote PoIs, (C) Geo-location noise.

Moreover, the geo data items in both of the first two classes (A) and (B) may have different importance/weight in representing user interests. For example, a user explicitly requesting for weather forecast has a general interest for the extended area around that location, while a user requesting directions to a specific location has a specific interest in that location (e.g., to practice a sport or to shop at a store at that location).

In one or more embodiments, geo data items that identify actual user visitations are classified based on anchoring tokens. An anchoring token is a qualifying condition that persistently indicates actual user locations/areas at times of inserting geo data items into the traffic flow. Having identified such tokens, it can be determined that geo data items pointing to a predefined vicinity (local and temporal) of the tokens' indications are actually pointing to the user's physical locations. For example, a frequent observation that a user was within a 500-meter range of a geo location (37.3681, −122.0372) at 4:00 pm as well as at 4:15 pm. Accordingly, this observed condition is used as the anchoring token and added to the anchoring token set. Subsequently, any geo data item pointing to that area and being within that time interval is determined to be indicative of the user's actual physical location.

In one or more embodiments, anchoring tokens are based on available/observable resources. For an example related to cellular service providers, the anchoring token may be an estimated coverage area of the user's base station. In another example related to Internet service providers, enterprise network owners, or HotSpot owners, the anchoring token may be a neighborhood of the observed user's access point, DSL line, Internet PoP, etc. In yet another example, the anchoring token may be a geographical area associated with the user's source IP address.

Moreover, anchoring tokens may be related to non-geographical entities. In one or more embodiments, a token is a specific Internet service or a traffic tag that is persistently (or predominantly) accompanied by geo data item identifying actual user locations. Examples of such tokens include mobile navigation services, specific values of HTTP fields, fragments of HTTP URI, key-value pairs embedded in data payload, etc. For example, the geo-coordinates (41.9911, 97,2367) reported by the "anchoring" Garmin navigation service:

http://connect.garmin.com/activity/
214215672?sk=Age0_0ryNsM6crCI7cGdXvLZXJ7Vs-
AqcoLSWLLOoAnXPz5Y3CEX-WYtECa-
y14L&pid=5902&DATA=
[{%221od%22%3A%2234%22%2C%22mo%22%
3A%220.01%22%2C%22mc%22%3A%22%
5B41.9911%2C-
97.2367%5D%22%2C%22ti1%22%3A24%2C%
22TS%22%3A1345776430435}

Another example being an "anchoring" homepage HTTP header field:

homepage: 42.72728391124494,−88.05365582617189, 10;

Yet another example being an "anchoring" 'sll.' key in Google search on mobile devices:

www.google.com/m/gne/suggest/
v2?q=&h1=en&app=iss&appv=133247963&
platform=android&g1=US&s11=45.718672,-
121.514698&acc=457&feeds=qs,list,ns Next, to identify "seeds" of such non-geographical anchoring tokens, an analyst user may construct a controlled identification environment. In one or more embodiments, one or more mobile devices (or smartphones) are instrumented to log Internet traffic during their usages. In a test period, a user of such device would be mobile and use various popular apps that are likely to report geo coordinates (such as navigation apps, social networking apps, Internet search, etc.). At the end of the testing period, the locations found in the collected traffic are compared to the actual user's mobile trajectory. Then, the sources of location reports that persistently match the user's actual movements are chosen as anchoring tokens.

In contrast to PoIs related to actual user locations, a multitude of remote PoIs can be identified by observing users' network activity, such as accessing web services, using mobile apps that communicate with Internet servers or other applications sending geo-location data through the network to/from specific servers. For example, a user may be travelling and searching ahead for the best-rated restaurants at his destination, or for the directions to destination, or the weather forecast at the destination. Syntax of user's network activity may be used to identify remote PoIs, as well as to aggregate results around them. As a special case, user's queries might be leveraged.

To identify remote PoIs, the Internet traffic that contains user requests and corresponding responses are observed. The semantic of such traffic may follow an expression of user interest: user transmits geo-location coordinates as a part of his request for content at the coordinates' location and receives at least a related response to the query; or the user receives geo-location coordinates in a response to the query. On the other hand, geo-coordinate reports existing in some types of traffic (e.g., geo-coordinates corresponding to an area for which a weather app is sending a weather report)

may be ignored until it becomes apparent that the geo data items are relevant, i.e., that the geo data items either refer to the user location or to a location that is of interest to the user. This criterion is met after analyzing other types of information, such as other geo data items, PoIs relevant to the user, information associated with the user in his profile, interests, attributes, and demographics gathered about the user.

In one or more embodiments, to ensure that the observed request-response traffic contains relevant geo information, only certain request-response traffic are used for analysis, for example those traffic where response messages contain one or more geo data items, while the request may or may not contain geo data items.

To eliminate geo location noises, such as a user may be casually swiping over a Google© Map without being interested in anything specific, persistence of geo data items is evaluated as related to a specific area. A number of metrics may be used to determine the persistence. In one of the embodiments, the rate of requests may be applied, such that the number of requests for a given area and a predetermined time interval is required to be greater than some threshold and/or lower than another threshold (in order to ensure that a user can read all response data). The setting of thresholds may be established according to the volume of reported geo-coordinates or according to the specific network activity. For example, querying for a restaurant at a specific location and receiving a response with geo-coordinates of 5 existing restaurants is an expression of user's interests, while repeatedly clicking and quickly hovering over a Google© Map is not. Another persistence measure could be the rate overlaps in geo-location responses. For example, a user shopping for a hotel accommodation would observe overlaps in geo data items corresponding to similar hotels offered by multiple web sites, thus confirming his interest for a hotel in a given area.

Finally, once the initial geo data items of relevant remote PoIs are identified, any traffic that points to the neighboring locations of such reports may be considered as a source of other relevant PoIs. For example, having identified that a user is interested in a hotel on Bahamas at a given time, any user's searches at that time pointing to locations around the hotel would also be considered for relevant PoIs.

In summary, identification of relevant remote location information (to differentiate from noise) included in traffic related to network activity may be based on at least geo data item persistency, semantics of the network activity based on which the geo data item is extracted, and vicinity to a location previously identified as relevant. Based on the foregoing, geo data item that are not classified as indicators of actual user locations or remote relevant locations are considered as a geo-location noise.

In one or more embodiments, geo data items that identify actual user visitations are classified based on temporal pruning to remove geo-location noise. The pruning requires that a user exhibits some stationary properties at the reported location, which would help indicate that the user is actually interested in them. For example, to be considered for analysis, a geo data item has to be sent from a given location at least 3 times in a 15 minute interval. This rule discards PoIs that were never actually visited, such as most gas stations or restaurants near a highway on which the user is driving.

In one or more embodiments, geo-location noise classification criteria are adaptive, such that geo data items initially classified as noise may be re-classified as useful geo information later on. Such re-classification may occur after a discovery of initial anchoring tokens and/or "seeds" pointing to remote PoIs. Consequently, geo-location noise are not be discarded, but rather stored for later processing.

In Step 203, PoIs are retrieved from a PoI information repository based on at least one geo data item of the geo data items extracted from user network traffic flows. In one or more embodiments, any PoI within a range from each geo-location identified by each of the extracted one geo data item are retrieved from the PoI information repository. In one or more embodiments, each range from each geo-location is based on an uncertainty measure of a corresponding one of the extracted geo data item. For example, the uncertainty measure may be based on the digitization truncation error range when the physical longitude/latitude is converted to a numerical value. Generally, fine-grained location reports (i.e., geo data item with relatively small range) can uniquely identify a single PoI in the immediate proximity.

However, numerous reported locations cannot be mapped to such unique PoIs due to coarse-grained geo-location data (i.e., geo data items with relatively large range or imprecision as described in reference to FIG. 1B above) and/or a lack of any candidate PoIs in a targeted proximity (e.g., within the range of the geo data item). For example, network traffic logs from a large cellular operator identified that about 50% of geo data items are coarse-grained, having accuracy (e.g., used as range) of only one square kilometer. Therefore, while coarse-grained geo data items preserve user privacy, they effectively obfuscate true PoIs by increasing the number of candidate locations of interest, e.g., tens or hundreds locations.

In Step 204, a weighted count of the PoI is generated (e.g., tallied) for each of the geo data items. In one or more embodiments, the weighted count is weighted based on an attribute of a geo data item for which the weighted count is generated.

In one or more embodiments, the attribute represents context of the network flow from which the geo data item is extracted. In one or more embodiments, the context is determined based on a keyword that is co-present with the geo data item within a consecutive portion of the network traffic flow, where the consecutive portion has a length determined according to a keyword parsing rule. Specifically, the keyword is extracted from the network traffic flow according to the keyword parsing rule and then correlated to the PoI to generate a correlation measure. In particular, the attribute of the geo data item includes the correlation measure.

Context-based extraction of PoI identities is particularly effective for geo data items that correspond to user's network activity. Specifically, context of the reported location can be extracted from the textual description that accompanies the location's geo data item. Subsequently, employing such textual context, the actual PoI can be identified. For example, the following excerpt demonstrates joint presence of a location's geo coordinates and corresponding textual descriptions in the traffic of a weather application:

locationHistory="RECENTLOCATIONS: {{ } 39.6172 −91.9283 ADDRESS {32122 Marilyn Road 589} {Monroe City} MO 63456 { } US { } { } 6}";

To convert such textual context to an actual PoI, the context (i.e., a text string of a pre-determined length that precedes or follows a geo data item) is extracted and checked to determine whether there exist any correlation between the context and any of the PoIs that can be found at or near the specific location. One possible approach tokenizes the extracted string to keywords, and queries a PoI information repository with the keywords as well as the reported geo coordinates. In the previous example, the geo-coordinates based query uses "39.6172-91.9283" as the search phrase, while the keywords based query uses any of the following strings as the search phrase: "locationHistory", "RECENTLOCATIONS", "32122", "32122 Marylin", "32122 Marylin Road", etc.

Once an overlap between the results of keywords-based and coordinates-based queries is found, the PoI related to the overlap is selected as the actual PoI. For example, suppose that the query with geo-coordinates (39.6172, −91.9283) returns "Joe's Haircuts", "Bob's Steak" and "Jeff's Shoes" as businesses existing at that location. Then, if a keyword query with "32122 Marylin Road" returns "Jeff's Shoes", then "Jeff's Shoes" is determined as the actual PoI corresponding to the geo data item.

In one or more embodiments, the attribute of a geo data item (for which the weighted count of a PoI is generated) represents a proximity measure of a PoI category with respect to other PoI categories in PoIs retrieved from the PoI information repository. To identify a PoI corresponding to a user's interest among a set of PoIs related to an area covered by a coarse-grained geo data item, historic knowledge of previously discovered/inferred PoIs is used. In one or more embodiments, proximity-based scoring to the categories (referred to as category scoring) of previously discovered/inferred PoIs is used in order to reconstruct general interests of the observed users. Examples of the PoI categories are "coffee houses" for PoIs such as Starbucks© or Pete's© Coffee, "football" for NFL© stadiums, etc.

In one or more embodiments, category scoring can be represented by any metric that cumulatively assigns higher scores to PoIs which are or were closer to the extracted geo data item. Consequently, whenever PoI is uniquely identified, it receives the highest score. In one or more embodiments, user interest vectors (also referred to as score vector, category score vector depending on the context) are used to organize scoring mathematically. The coordinates of a user interest vector for a given user are categories of any historically observed PoI candidates, and the values of coordinates are the scores accumulated for each PoI category over time.

For example based on historical observation, in a given area, an observed user was predominantly in a vicinity of restaurants surrounded by numerous bookstores and shops. Therefore, the user interest vector coordinates may be the names of these businesses (such as "Antonio's Pizza", "Books for Dimes", etc.) or the business categories, i.e., "restaurant", "bookstore" and "shop". Historical fine-grained geo data items indicated that the user was mainly entering restaurants in this area. Thus, having the highest scores, the current closest restaurant in this area is the most likely PoI for the user whenever geo data items are inconclusive.

In one or more embodiments, PoI categories are organized in a hierarchical tree and the proximity based category scoring also applies to higher-level hierarchical nodes. For example, the categories "gym" and "tennis court" are both subcategories of the category "sport facilities". When a user has several geo-location reports including PoIs in the "gym" category and then a geo-location report that includes a PoI in the "tennis court" category (in addition to other co-located PoIs), it can be inferred that the user is interested in the "tennis court" PoI due to "tennis court" being a subcategory of "sport facility" and the user previous visitation history including another subcategory ("gym").

As shown in the example depicted in FIG. 1B above, a PoI may be retrieved in relation to multiple geo data items. In Step 205, multiple weighted counts of a PoI are aggregated across all such multiple geo data item to generate a score or a category score of the PoI. In one or more embodiments where the PoI is associated with a hierarchy of categories, the score is generally referred to as a category score specific to the category in context. When the PoI in context is not categorized, i.e., with a single hierarchy level, the general term "category score" is referred to as simply score.

In Step 206, a determination is made as to whether category scores in a user interest vector (i.e., category score vector) of multiple PoIs or PoI categories are differentiated from each other. In one or more embodiments, the determination is made based on a category score differentiation measure. For example, the category score differentiation measure may be based on a ratio of the highest category score over the second highest category score in the category score vector. In other examples, different statistical measure may be used to measure whether category scores are different enough in the category score vector to indicate user interest in any particular PoI category of the category score vector. Returning to the discussion of Step 206, if the determination is positive (or "YES"), i.e., the category score differentiation factor meets a pre-determined requirement, the method proceeds to Step 208. Otherwise, if the determination is negative (or 'NO"), i.e., the category score differentiation factor does not meet a pre-determined requirement, the method proceeds to Step 207, where a geo data item extraction parameter and/or a PoI retrieval parameter is adjusted to improve the category score differentiation factor.

In one or more embodiments, retrieving the PoIs includes matching a time stamp of each geo data item to a pre-determined recurring time interval. In other words, any geo data item with a time stamp not matching the pre-determined recurring time interval is discarded and not used to retrieve any PoI. In such embodiments, the pre-determined recurring time interval is the PoI retrieval parameter that is adjusted to increase the category score differentiation measure of the category score vector. For example, the pre-determined recurring time interval may be adjusted as recurring on a daily basis, a weekly basis, a monthly basis, a quarter basis, or other recurring time period. In one or more embodiments, the duration and beginning of the pre-determined recurring interval is specific to the geo data item and can be specified based on frequency, reoccurrence, or other criteria.

In an example to include temporal dimension to PoI retrieval and scoring, interest vectors are generated that correspond to specific time intervals of a day (as well as the specific locations). For example, each day is divided into a series of intervals of a pre-determined duration (e.g., 30-minute intervals). Then, category score vectors are compared to each other for all time intervals (e.g., 11:00 pm to 11:30 pm, etc.) to identify a particular time interval where the corresponding category score vector has a satisfactory category score differentiation measure.

For example, the vector for this identified time interval (e.g., 11:00 pm to 11:30 pm) may be [10, 2, 1] for restaurant, shops, and gym. Consequently, with this additional information than the previous example, it can be inferred that the most likely PoI candidate is a restaurant at/near the geo data item identified location during 11:00 pm to 11:30 pm, while for the same geo-location coordinates the gym at/near the location becomes the most likely PoI between 6:00 pm and 6:30 pm, when the vector for that time interval is [2, 2, 5] for restaurant, shops, and gym.

In one or more embodiments, retrieving the PoIs includes assigning a PoI category to a group of PoIs that are grouped together base on a pre-determined similarity criterion. For example, two PoIs Starbucks© and Peet's Coffee© may be grouped into the PoI category "artisan cafe." In such embodiments, the score of all PoIs in the group are combined to generate a category score of the PoI category. In such embodiments, the hierarchical level of the PoI category is the PoI retrieval parameter that is adjusted to increase the category score differentiation measure of the category score vector. An example of adjusting the hierarchical level of the PoI category for retrieving PoIs to increase the category score differentiation measure of the category score vector is described in reference to FIG. 1A above.

In one or more embodiments, the PoI category ranking of the user is correlated with another PoI category ranking of another user to identify a co-located PoI category. In particular, the PoI category ranking and the another PoI category ranking are based on geo data items having respective same time stamps matching a particular time interval. In one or more embodiments, the PoI category ranking is adjusted based on the co-located PoI category. Examples of adjusting PoI category ranking based on the co-located PoI category to infer user interest are described below.

In some cases, geo data items of an individual user may not be sufficient to resolve the user's ambiguous PoI indications, irrespective of the number of the user's geo data item data attributes employed for the interest vector profiling. In one or more embodiments, the patterns of the user's collocation with other people at specific places/areas, at specific times of day, etc., are analyzed to create a collocation vector. Collocation vectors are used to infer the user PoIs based on activities of other people. The coordinates of a collocation vector are the "historically co-located" persons while values of the vector elements (i.e., coordinate values) represent collocation likelihood with such persons. For example, if we observe a user Bob and see that he repeatedly visits similar bars and restaurants with users Joe, John and Jeremy, than these three users become coordinates of Bob's collocation vector, and their coordinate values are proportional to the number of times they visited same venues as Bob.

In one or more embodiments, the interest vectors of the persons that are most likely to be collocated with the observed user are used to identify the ambiguous PoIs of the observed user. Specifically, the PoI with the highest scores for the majority of such collocated persons is selected. For example, Bob's interest vectors based on geo data item associated with at a given time of a day is not sufficient to determine whether Bob is at a local restaurant, gym or store. Therefore, Bob's collocation vector for the given area and time is checked to identify Joe, John and Jeremy as vector coordinates. Next, to infer Bob's PoI, Joe's, John's and Jeremy's interest-vector scores are evaluated for the given time and location. It is then determined that they score restaurants highest. Accordingly, Bob's corresponding PoI is identified as a restaurant. In another example, a user A is determined to be a friend with a user B based on one or more information sources, such as databases (e.g., white pages, city hall registry data, etc.), previous collocations, on-line social networks, other on-line information, such as on-line activity, e-mail exchanges, short message exchanges, voice calls, phone activity, etc. If the user A is reporting geo-coordinates at a location where there are near-by PoI X, PoI Y and PoI Z, while the user B and user C are reporting geo-coordinates of the same location, but are known to be in PoI X and PoI Y, respectively. Based on the information that the user A is known to be friend with the user B, it is concluded, with a high probability, that the user A is visiting PoI X.

In one or more embodiments, the score of the PoI is adjusted based on a profile of the user. When multiple PoIs are retrieved based on a single geo-location, whether reporting the user presence at that location or associated with a network activity about that specific location, known interest of the user identified based on a user profile is used to select the relevant PoI. The user profile may have been previously built by using geo-location information or through other sources, such as an on-line social network user public profile. In one or more embodiments, if only one of the PoIs at a given geo-location falls within known user interests based on the user profile, the user is assumed to be visiting that PoI. In one or more embodiments, if any PoI conflicting with a known user interest based on the user profile, the PoI is excluded from the set of relevant PoIs for the user.

Figure 3:
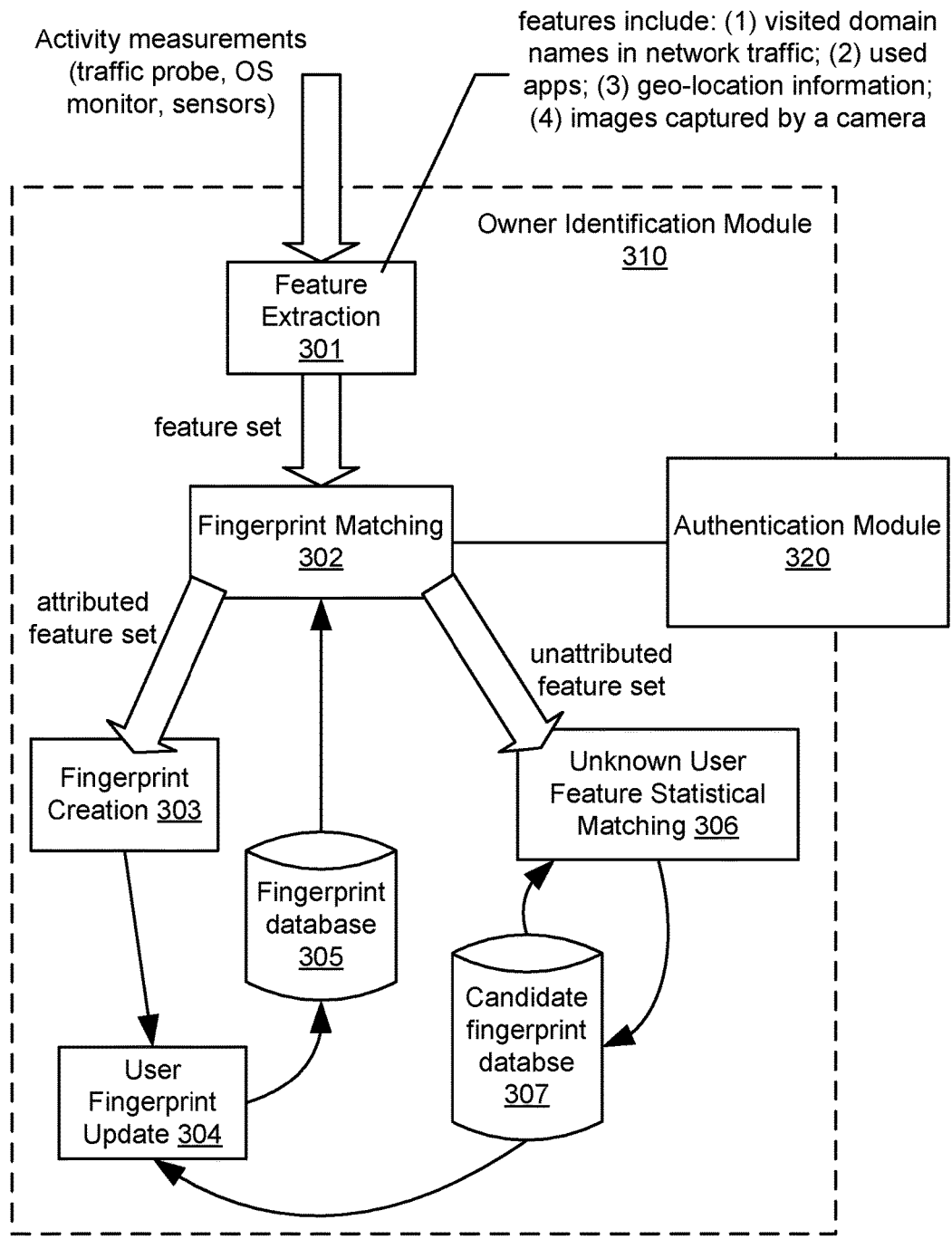
FIG. 3 shows an example according to aspects of the invention.

In Step 208, when the score differentiation measure is satisfactory based on a pre-determined criterion, the interest level of the user is inferred based at least on the score of the PoI and/or the category of the PoI category as described above. For example, when the highest score is at least twice as high as the second highest score, the PoI or PoI category having the highest score is inferred as representing the user interest. In one or more embodiments, the score vector and/or category score vector are presented to an analyst user. In one or more embodiments, one or more PoI or PoI category with higher scores in the score vector and/or category score vector are presented to an analyst user. In one or more embodiments, a location based service is provided to the user based on the score vector, category score vector, or the one or more PoI or PoI category with higher scores in the score vector and/or category score vector. For example, if it is inferred based on the category score vector (e.g., the artisan coffee PoI category having highest score in the category score vector) that the user is interested in artisan coffee in a particular location and/or during a particular time interval, a customized promotion advertisement and/or promotion coupon may be delivered to this user. In one or more embodiments, in the context of the method flow chart depicted in FIG. 2A above, a feature of the user activity may be based on the score vector, category score vector, or the one or more PoI or PoI category with higher scores in the score vector and/or category score vector. In other words, these score vector, category score vector, PoI, or PoI category, extracted from user activity data obtained during the fingerprint learning phase, may be used features to generate the fingerprint of the user, as described in reference to FIG. 2A above. Similarly, these score vector, category score vector, PoI, or PoI category, extracted from user activity data obtained during the fingerprint matching phase, may be compared to the fingerprint to determine a match, as described in reference to FIG. 2A above FIG. 3 shows an example block diagram (300) in accordance with embodiments of the invention. As shown in FIG. 3, the block diagram (300) illustrate an authentication methodology to identify (i.e., authenticate) users based on their activities in the cyber space and possibly in the physical world and then use such knowledge on the user identity to authenticate the user in both the physical world and cyber space. The depicted authentication methodology is referred to as Cy-Phy authentication and is at a high level composed of two stages (modules): an owner identification module (310) and an authentication module (320).

The owner identification module (310) isolates unique features in the traffic that the user generates on the Internet, the applications he/she uses on her device (such as laptop, smartphone, and tablet), and the movements of the user as detected by his/her device (e.g., through a GPS receiver, accelerometer, light detector, camera) that are composed to (i) build user fingerprints that represent a unique identifier of the user in a first learning/training phase, and then (ii) continuously match observed activity with any available fingerprint in order to identify the user generating such activity.

The authentication module (320) uses various authentication techniques and protocols to securely attest the identity of the user to an information systems in the cyber space or to other devices in the physical world. For example, when the user attempts to access a web site that requires the user to authenticate using an electronic certificate, the authentication module (320) will unlock the private key associated to the electronic certificate only if the owner identification module (310) confirms, as consistent with the identity of the legal owner, the identity of the user who is trying to authenticate with the website. As another example, when the user attempts to access a restricted area requiring authentication through a smartcard or an NFC reader, the authentication module (320) unlocks the certificate inside the smartcard and generates the proper response to an NFC reader only if the owner identification module (310) confirms, as consistent with the identity of the legal owner, the identity of the user who is trying to gain access.

From the above examples it is apparent that the operation of the authentication module (320) is locked to the operation of the owner identification module (310). The authentication module (320) will provide the credentials only for the legal user identified by the owner identification module (310). On the other hand, the identification stage will continuously monitor the activity of the user to match her fingerprint so as to continuously verify her activity.

While some authentication technique is based on either a secret (e.g., password) known by the user, or a device containing a secret (e.g., authentication token, smartcard, private key stored in the memory of a laptop, desktop, smartphone or tablet), or a combination thereof, the technique described herein is based on the behavior of the user. Hence, while some authentication credentials can be stolen and/or lost, the authentication logic of the technique described herein is based on the user behavior and cannot be lost, stolen, or even easily mimicked. Specifically, even if the device containing the private key of the user is lost, the key will not be unlocked when someone else is using the device. The authentication technique described herein can be combined with the other authentication methods to provide an additional level of security.

As shown in FIG. 3, the owner identification module (310) is divided in (a) a fingerprint learning phase, in which an increasing number of user features is identified for fingerprinting, and (b) a fingerprint matching stage, in which the fingerprints are applied to identifying the person generating the activity. Specifically, the feature extraction function (301) extracts features from the cyber and physical activity of the user of the device hosting the Cy-Phy authentication system (i.e., the owner identification module (310) and the authentication module (320)). Extracted features are matched against previously created fingerprints (from the fingerprint creation function (303)) and associated to known and unknown users by the fingerprinting matching function (302). A known user is one to which an identification token was associated during the fingerprint learning phase in which the user device with the Cy-Phy authentication system was ensured to be in possession of a given user (referred to the legal user) whose identification token was embedded in the authentication module. An unknown user is one for which one or more fingerprints can be extracted from the activity analyzed by the device during a normal operation (i.e., not training) period.

During the fingerprint learning phase, if a set of features can be associated to a user, it is passed to the Fingerprint Creation function (303) to find out whether more fingerprints can be extracted from the feature set and associated to the same user in the fingerprint database (305). The update of the fingerprint database (305) is carried out by a user fingerprint update function (304). If a set of features cannot be associated to a user, it is passed to an Unknown User Feature Statistical Matching function (306) that statistically matches the features to a set of candidate fingerprints (temporarily stored in the candidate fingerprint database (307)) to possibly generate new fingerprints to be included in the fingerprint database (305) by the User Fingerprint Update module.

Examples of extracting features and generating fingerprints are further described below.

Features Based on User Identifiers

A user identifier is a parameter employed by an Internet service to uniquely represent or track a user. The identifiers may be explicit, such as personal names or email addresses. On the other hand, many Internet services employ their own and less obvious implicit user identifiers, which seem a priori random, such as some numerals or strings. For example, Facebook® internally uses numeric identifiers for user identification. Table 1 shows several user ID types found in Internet traffic.

TABLE 1

| User ID | Can be found at: | Sample |
|---|---|---|
| Facebook ID | HTTP URL | session_key=#####-< Facebook ID > |
| | Cookie | c_user=< Facebook ID >; |
| | | m_user=email%3a< Facebook ID > |
| Twitter ID | HTTP URL | oauth_token=<Twitter ID>-##### |
| Email address | Cookie | m_user=email%3a |
| | IMAP payload | USER=email@domain.com |
| | POP3 payload | LOGIN=email@domain.com |
| | MSN payload | MSNMSGR=email@domain.com |

Recognizing user identifiers employed by numerous Internet services would be infeasible to accomplish by manual inspection. Automated learning of user identifiers may be performed based on two metrics: persistency and uniqueness. The reasoning behind the uniqueness metric is to compare parameters appearing in the traffic of various users and keep only the parameters that are unique to each individual user. Observing the parameters over large user groups and over extended time, sufficiently prunes the set of representative identifier candidates. However, in the pruned parameter set, there will be many other items which do not identify users. For example, such parameters are short-term session identifiers, authentication nonces, website-specific short-term parameters, etc. To refine learning of user identifiers, the persistency metric is used, which is a measure of time during which a parameter remains unchanged. Accordingly, the parameters that are unique to a user as well as remain invariant over long time intervals may be selected for user identifiers.

Features Based on Hostname and Domain Name of Accessed Servers

Apart from direct user identifiers described above, a number of features related to user's online behavior may have user-identifying properties. Such features commonly reflect personal interests that individually or as a set may clearly point to a specific user.

Tracking users on basis of host- or domain names the users visit is one such user-identifying feature. For example, observing that a user repeatedly visits a website of a university indicates that the user is somehow affiliated with that university. If the user further visits sites that sell books at the beginning of each semester, the user is likely a student. Even further, if the student follows news from a specific town, he is likely to have family there. Following this line of investigating hostnames, a user may iteratively be identified in a large population.

Features Based on Web Service

Analyzing web services is an augmentation of host-based user fingerprinting. In fact, the same host may provide several services. In one example, different services are provided through different ports. In another example, when services are accessed through the HTTP or HTTPS protocol, different services may be accessed by using different URLs. In Internet, there are numerous web services whose traffic may help our system gain a detailed understanding of personal interests as well as track user actions. For example, to learn about music preferences, users' interactions with Pandora® or iTunes® music services may be tracked. In the case of Pandora®, personal music genre preferences may be learned by looking at the users' HTTP GET messages and extracting the nominal values of a key-value pair genre=<value>.

Similarly, shopping preferences may be extracted by looking into the three-letter shopping categories in Craigslist's HTTP GET messages (e.g., AOS: automotive, BKS: books, ELE: electronics, etc.). The analysis may also be conducted on the queries sent to search engines, categories of videos and books being viewed, and so forth.

Features Based on Mobile Apps and Traditional Applications

With a rapid growth of smartphone usage and an increasing trend of embedding web communications in various applications, users may also be fingerprinted by the apps/applications they use.

A number of features are based on hundreds of thousands of applications communicating via Internet. For mobile apps, the features may be based on regular expressions which capture occurrences of app-identifying parameters occurring in the apps' traffic, as well as the traffic of advertizing and analytic services embedded in the apps. For example, TABLE 2 illustrates that an app may be identified by observing the value of the parameter "app_name=" in the traffic exchanged with Googleads®.

TABLE 2

GET /pagead/images/go_arrow.png HTTP/1.1
Host: pagead2.googlesyndication.com
referer: http://googleads.g.doubleclick.net:80/& . . .
& app_name=4.android.zz.rings.rww2   & . . .
User-Agent: Mozilla/5.0 (Linux; U; Android 2.3.3; . . .

In case of regular applications communicating via Internet, a technique that automatically extracts entire state machines of the apps' communications identified via traffic observations is described in U.S. Pat. No. 8,494,985 entitled "System and Method For Using Network Application Signatures Based on Modified Term Transition State Machine." In one or more embodiments, the extracted state machines described in U.S. Pat. No. 849,498 are used as the features of traffic flows under the analysis.

Features Based on Geo-Reports

Increased popularity of online geo services, such as Google Map®, as well as wide spread usage of location-based services in smartphones, has brought reports of users' whereabouts to Internet traffic. These reports, similar to the previously described apps or web services, may have user-identifying properties. Such properties are based on extraction and identification of specific user interests in the physical world locations and content. Geo-reports provide a link between the online and physical worlds. For example, online users may be identified by analyzing the traffic related to physical locations that users visit. Similarly, the system may leverage its knowledge about the locations that users visit in the physical world in order to extrapolate it to the online content that users may be interested in browsing, thus becoming capable of attributing the corresponding browsing traffic to the appropriate user identities. On the other hand, geo-reports found in traffic may not even represent true user locations, but places that users are browsing for online directly. Correspondingly, the system may use online activity to predict users' future reporting in the physical world, i.e., the online browsing reports may be extrapolated to the locations that will be reported in the physical world as an indication of the users' identity.

Geo-reports are key-value pairs that appear in the Internet traffic as longitudes and latitudes. The reports may be found in communications of various Internet services, which individually choose their reporting format. Specifically, the names of keys that represent latitude or longitude values may be different for different services. Commonly, geo-reports may be found in HTTP URIs or communication payloads, e.g., XML content, JSON dictionaries, etc. An example of a geo-report employed by Google's mobile search is shown in TABLE 3 below.

TABLE 3 www.google.com/m/gne/suggest/v2?q=&hl=en&app=iss&appv=
133247963&platform=android&gl=US&sll=
45.718672,−121.514698&acc=457&feeds=qs,list,ns Features Based on Visited and Sought PoIs In their raw form, geo reports representing merely numeric latitude and longitude values may not be sufficiently informative to be used as user-identifying parameters. Instead, if these raw reports are translated to venues or landmarks (points of interest) that exist at the reported locations, such transformed data may provide the context of locations that are of interest to users, which then becomes a user-identifying feature. To translate raw geo-reports to meaningful places, a number of location services may be leveraged. These services, such as Google Places °, provide the translation for both the reports related to actual user locations as well as the reports obtained from users' online browsing.

Next, multiple PoIs may correspond to a single latitude-longitude report. Then, the system performs a refinement to identify a subset of PoIs that may be of interest to the user as means of obtaining a user-identifying reference. To this end, the system uses a number of scoring metrics to choose a subset of PoIs that the user is most likely to visit or browse for online. The scoring is based on the proximity of "ambiguous" PoIs to the reported location, as well as the context of the PoIs and the report's time. First, for each report, an equal score update may be attributed to the candidate PoIs within the report's accuracy range. For example, if the report is ambiguous in an area of 20 m², and there are 5 PoIs within that area, the scores of all 5 PoIs may be updated by an equal amount. Then, leveraging repetitive patterns of human mobility, the scores may be accumulated historically and (with the help of score updates) the system may decide which of the 5 PoIs is the most relevant, i.e., has the highest cumulative score for the user.

The contextual aspect of scoring helps discover user interests in particular brands, venues or activities. For example, separate scores may be kept for the exact PoIs and PoI categories. While the exact PoIs help reveal venues, the categories may help revealing interest in specific activities as well as help infer specific venues when the reports themselves are not sufficiently indicative. For example, if categories reveal that a user has a strong interest in coffee (say by observing his frequent visits to Starbucks®), then it is determined that the user is at a coffee shop, such as Peet's® coffee, when a geo-report offers a choice between a bar, a tennis court, and a coffee place.

Finally, the scoring involves characterization of temporal patterns which are also inherent to human mobility at many timescales. For example, people like to visit gym after work, people like to go out to their favorite places on weekends, etc. Such aspects of human behavior are captured by maintaining individual scores over diverse time intervals. For example, individual scores may be computed on the traffic obtained in morning hours, afternoons and evenings; or on Mondays, or each spring, etc. Then, the user-identifying interests are the ones that have distinctive scores at particular scoring timescales.

Features Based on Relationships

A part of user fingerprinting is discovery of user's social relationships. Identifying such relationships may be an extremely complex task, because many times the relationships may only be inferred. For example, two people posting comments on a similar topic within a similar time frame may be in some sort of interaction. Similarly, the interaction may exist between people that regularly visit one or more common places. Accordingly, publically available content in online social networks as well as the headers of various communication services may be used as indicative features. For example, an indication of a relationship between two persons, such as Facebook® friendship or cross posting; Twitter® following, replying or re-tweeting; email sending, receiving or forwarding, etc. may be used as the features.

In one or more embodiments, the user activity analyzer (325) is further configured to perform traffic attribution and block correlation. Being originated to the same device, flow blocks (also referred to as traffic blocks) may be considered to correspond to a single user. Traffic attribution identifies the user that generated the traffic by comparing user identifiers found in the traffic with the user identifiers (user IDs) that are readily known to be associated to the given user.

It is worth noting that a block may contain many user identifiers. In a possible embodiment, multiple user IDs appearing in the same block would indicate that these user IDs in fact do belong to the same user. The function of associating various user IDs to the same identity or persona of a user is called user ID correlation. When traffic blocks contain identifiers of multiple users, such as user U1 and U2, the blocks may be attributed to a single user if: (i) there is at least one traffic block in which both U1 and U2 appear together or (ii) as long as there is at least one flow block in which a third user ID U3 is found together with U1, as well as at least one flow block that ID U3 is found together with U2. Hence, user ID correlation also performs a correlation of blocks containing the traffic generated by the same user.

User correlation is a process of identifying which different user IDs correspond to the same user. To achieve user correlation, the first step is to associate a unique user ID to each vector in the block at the stage of block attribution. Any other implicit user identifiers found in the vectors are associated to that unique user ID. Such association between implicit and explicit user identifiers found in the traffic may be stored permanently for future reference. Similarly, the unique user identifiers are also permanently stored. Consequently, if a block cannot be attributed to a user uniquely and deterministically (e.g., through one of the approaches presented above, such as mapping tables or RADIUS), the implicit user IDs may be used instead for this purpose.

A side effect of attributing flows to users is that different blocks become correlated by means of features extracted from the corresponding traffic flows. Features extracted in flows belonging to one block may help attribute another block to a user. Consequently, all extracted features may be considered a part of the user's fingerprint.

In one or more embodiments, the user activity analyzer (325) is further configured to perform fingerprint creation and fingerprint feature selection. With a portion of the captured traffic already attributed to users in a form of flow groups (e.g., user flow group A (332a), user flow group B (332b)), the features existing in the flow groups may be statistically characterized for their quality of becoming the fingerprinting features. The features with good quality may then be used as user fingerprints (e.g., fingerprint A (332a1), fingerprint B (332b1)), In other words, the features with good quality may be used to attribute more traffic (that was previously uncharacterized) to users.

Some of the features that are examined in each block of flows for their user-identifying properties are the explicit user identifiers embedded in the traffic, the apps used by the user to generate those flows, the network services accessed by the user via those flows, and the geo-location information embedded in those flows indicating where the user is when the traffic is generated, i.e., any one or multiple of the features described above. The explicit user identifiers may be used to attribute traffic to users in a deterministic way, and therefore are referred as deterministic features. Examples of deterministic features include online social network IDs, email addresses, etc. Other features, such as services/apps used by the users, the geo-location information of users, are used to attribute traffic to users according to their statistical properties (models), and therefore are referred as statistical features. Each statistical feature may not be specific to users. However, the combination of multiple features may provide enough information to fingerprint users with high accuracy. For example, an app may be used by large number of users, but the combination of a set of apps may be very specific to a user; a set of network services may be used by many users, but a user may use those network services only when he is at certain location, and therefore the combination of a set of web services and user's geo-location information provides the specificity to fingerprint a particular user.

The statistical features are evaluated towards assessing their quality in fingerprinting individual users. The quality of the extracted features is assessed based on two important properties, uniqueness and persistence. The uniqueness property of an extracted feature measures how unique the feature is in identifying a user. In other words, the uniqueness property indicates how specific a feature is to a user.

The persistence property of an extracted feature measures how sticky the feature is to a user. In other words, how often the feature appears in the network traffic generated by the user.

The exact way of measuring uniqueness and persistence may be specific to each extracted feature. An example is described below. Assuming the number of distinct users identified by the system is $U_{all}$ and the number of users having the same feature $f_x$ is $U_{f_x}$, then the uniqueness of this feature may be measured as:

$$\text{Uniqueness} = 1 - \frac{[(U]_{f_x} - 1)}{U_{all}}$$

Obviously, a feature having a uniqueness measure of 1 means that only one user has that feature. When a feature has a uniqueness measure lower than 1, it means that the system has observed multiple users having that feature. Thus, the closer is the feature's uniqueness to 1, the more specific that feature is to some user, and therefore the more useful for identifying the users.

Let $T_{all}$ be the total duration of time the system has observed some user's online activity, and $T_{f_x}$ be the duration of time the system has observed feature $f_x$ appearing in some user's online activity. Then, the persistence measure of the feature $f_x$ can be defined as:

$$\text{Persistence} = \frac{T_{f_x}}{T_{all}}$$

Initially the user device (320) does not have any statistical fingerprints of users. With some seeding knowledge, the user device (320) starts to attribute a portion of traffic to users and extracts user related features from the attributed traffic. The quality of the extracted features is assessed and those features with good uniqueness and persistence properties are then absorbed by the user device (320) as user's statistical fingerprints. The assessment may be based on predefined criteria such as some carefully tuned thresholds. The statistical features whose quality is assessed as not good enough are stored by the user device (320) as candidate fingerprints. As new user related features are discovered, the user device (320) also reassesses the quality of existing user fingerprints and those candidate fingerprints, in addition to assessing the newly discovered features. After the assessment, previously good fingerprints may be demoted as not good enough, and candidate fingerprints may be promoted as good fingerprints.

In a possible embodiment, a traffic block (e.g., part of the flow group (333)) not attributed to any known user, neither deterministically nor statistically, is examined by the user device (320) to extract user related statistical features (e.g., feature (333a)). In this case, the user device (320) assumes there is a "new user", although the identity of this new user is yet unknown. This new user is assigned to a system-created user identify X and the user device (320) starts learning new features of this new user as well. If the user device (320) learns later that this user X's fingerprints are very similar to a known user Y's fingerprint, the fingerprints of X and Y are merged.

In a possible embodiment, the user's statistical fingerprints are employed in detection of false positives in the user ID updating (i.e., in detection of a wrong inference that two IDs belong to the same user). If multiple user IDs are extracted from the same traffic block and that block contains statistical fingerprints of multiple users, the system determines that the traffic was indeed generated by multiple users, i.e., the user IDs found in the block should not be considered to belong to the same user. An example of this scenario is that multiple users are sharing the same NAT device, so the block delineation incorrectly creates a single-user traffic block which was in fact generated by multiple users.

In a possible embodiment, the user statistical fingerprints may help to detect some cases that are difficult to detect by other means. For example, the features extracted from a block of traffic may be compared against the user IDs and the user statistical fingerprints. Let's assume that the user ID matching indicates that the traffic block is generated by user X, because this user's account is found in the RADIUS flows. In the meantime, the statistical fingerprint matching outputs that the traffic block is generated by user Y, because the set of network services uniquely used by user Y is present in the traffic. In this case, it is determined that user Y may have borrowed user X's device.

Fingerprint Based Traffic Attribution

For the unattributed flow groups (e.g., flow group (333), etc. in the ongoing portion (330b) of the user activity data (330)) which do not contain any user IDs in their traffic data, the flow groups (e.g., flow group (333), etc.) are attributed to fingerprints based on the distributions of features (e.g., feature (333a), etc.) the groups have. For this, the user activity analyzer (325) extracts features (e.g., feature (333a), such as the most frequently accessed web services) from the flow groups (e.g., flow group (333), etc.) and check if a subset of the features matches any of the fingerprint(s) from the fingerprint database (e.g., including fingerprint A (332a1), fingerprint B (332b1), etc.). Because the features may be comprised of very specific information (e.g., feature URLs mail.yahoo.com and mail.aol.com are considered to be distinct while they both represent emailing activity of users). In order to cover wider range of user activities with those specific fingerprints, the features are grouped into a few classes. Notice that there are some features general enough by nature. Therefore, a feature may be designated as equivalent to a class in order not to force all features to be grouped.

Classification of Fingerprints

In order to reveal the types of activities users are engaged in, user's online activities (e.g., websites they frequently visit) are analyzed and classified. For example, the user's online activities may be represented by the DNS names associated with various services, which often provide a good indication of the category of activities that users are engaged in. For instance, mail.yahoo.com indicates that a user is checking email; www.youtube.com indicates that the user is browsing and watching videos online. Therefore, the DNS names are obtained from the unassociated flow groups and then broadens the coverage of the DNS names by associating them to a service class and a service provider.

TABLE 4 lists an illustrative summary of the service classes, keyword samples used to classify DNS names into each service class, and service provider samples of each class. Notice that, similarly to the websites users visit, one may build such classification for any features considered as indicative of user activity. To represent classification on wider variety of more generic types of features, the classes used in the classification are referred to as "feature classes". In other words, each line entry of TABLE 4 corresponds to a feature class. More specifically, the first element of each line entry is a feature class.

TABLE 4

| Service class | Keywords | Service provider |
| --- | --- | --- |
| Banking | bank | wellsfargo, morganstanley |
| Blog | blog, buzz | huffingtonpost, boingboing |
| Book | book | barnesandnoble, half.com |
| Chat | talk, chat, messenger | skype, mtalk.google, aim |
| Dating | personals, harmony, match | plentyoffish, date |
| E-commerce | warehouse, market, buy | amazon, ebay, blockbuster |
| Education | .edu, college, education | medexch.med.unc.edu |
| Email | smtp, imap, pop, exchange | google, hotmail, yahoo |
| File hosting | upload, download, ftp | megaupload, dropbox |
| Gaming | game, casino | zynga, farmville, xbox |
| Map | maps, virtualearth | maps.google, wikimapia |
| Music | music, radio, playlist | pandora, itunes, zune |
| News | news | msnbc, ew, cnn |
| P2P | tracker, torrent, mininova | No specific domain |
| Picture | picture, photo | flickr, picasa.google |
| Search | search | google, bing, yahoo |
| Social | social | OSN1, OSN2, ning |
| Sports | sports | espn, bleacherreport |
| Travel | travel, hotel, flight | expedia, kayak, southwest |
| Video | video | netflix, youtube |
| Weather | weather, forecast | No specific domain |

For each unattributed flow group $u_i$? aou, let $s_i^j$ be a feature class identified from $u_i$'s traffic by feature classification (each $s^j$ is a feature class). Let $S(u_i)$ be the list of distinct $s_j$ associated with the traffic in the flow group, such that $S(u_i)=\{s_i^j\}$. Because $S(u_i)$ contains all the $s_i^j$ including the ones flow $u_i$ contained only once during the observation period of the system, considering the entire $S(u_i)$ may introduce inconsistency in determining the user behind flow $u_i$'s activity pattern.

To consider the most representative activities of users, the top k most frequently appearing feature classes $F_i$? $aUS(u_i)$ are used, where the length $|F_i|=k$. $F_i$ is referred to as a "representative feature class" of flow group $u_i$. The choice of k affects flexibility of mapping fingerprints to flow groups. Consider an example flow group with four features [ {f] $_1$, $f_2$, $f_3$, $f_4$}, existing fingerprints are compared to the flow group based on the representative feature class. If the length of feature class is chosen to be k=2 and F=[ {f] $_1$,$f_2$}, then any existing fingerprints containing [ {f] $_1$,$f_2$} is considered as a match. Whereas if k=4 and F=[ {f] $_1$,$f_2$,$f_3$,$f_4$} then only fingerprints with all four features are considered matching the flow group. As shown in the above example, the degree of the matching is configurable by choosing the value of k. A small k allows various fingerprints to be mapped to a flow group. A large k, on the other hand, allows only a small number of fingerprints to be mapped.

While, in this particular case, user activity is represented by the frequency of feature classes, it may be generalized to consider any statistical distribution (than just the distribution of top k features) that is able to distinguish activities (or properties) of a user from that of others.

Verification of Fingerprint Classes

Given a flow group, there may be more than one fingerprint contained in it.

In order to determine whether a fingerprint is good or not, a comparison is performed among fingerprints. Based on an assumption that a good fingerprint should be highly unique, a fingerprint in a flow group is verified whether it frequently reappears in other flow groups that contain other fingerprints.

Formally, let $N(G_i)$ be the set of flow groups in which a fingerprint G attributes to. Let R(G) be the set of fingerprints (other than G0 co-occurring with $G_i$ in a flow group. Set size of R (which we denote as $|R(G_i)|$) represents the number of unique fingerprints co-occurring with $G_i$. Thus, a fingerprint is removed from the existing fingerprints if it appears too frequently (i.e., over a predetermined co-occurrence rate threshold τ) with other fingerprints. In other words, if $|R(G_i)|/|N(G_i)|>\tau$, the $F_i$ is discarded from the existing fingerprint database.

Traffic Attribution

Two or more flow groups are associated if and only if their feature classes all match the same fingerprint classes. As a result, flow groups that share statistical fingerprints are associated together. Consequently, the two or more associated flow groups are attributed to the same user, i.e., it is concluded that the same user generated the traffic that is part of the two or more flow groups. The remaining flow groups which may not have been attributed to any user even with statistical matching are simply forwarded to a reporting system as failures.

In one or more embodiments, the authentication module (326) is configured to perform per-user policy enforcement based on a database of per-user policies (e.g., locked data item (334)). Once a block is identified as having been originated by a device operated by a specific user, the policies related to the specific user are retrieved to configure the authentication module (326). For example, the locked data item (334) may cause the authentication module (326) to operate in at least one of two modes:

(a) per block policy enforcement, i.e., the policy (334) is applied to those blocks that are associated to a given user by the fingerprint-based traffic attribution.

(b) per device policy enforcement, i.e., once a block is associated to a user, her policies are applied to all traffic coming form the source address (e.g., IP address) originating the traffic in the block. In this operation mode the authentication module (326) will keep track of the last user a given source address had been associated to. In case that changes, the authentication module (326) may retrieve the policies of the new user for reconfiguration. An example type of policy that may be reconfigured is one that requires the user to re-authenticate.

Continual Identification and Policy Enforcement

The disclosed method continually runs user fingerprint generation and policy enforcement as the device generates traffic. When a device is used by a user other than the one previously identified, changes in the user fingerprint are detected by the user activity analyzer (325) to attribute the new traffic to the new user's identity. In turn, the authentication module (326) retrieves and applies new policies that pertain to the new user.

Figure 4:
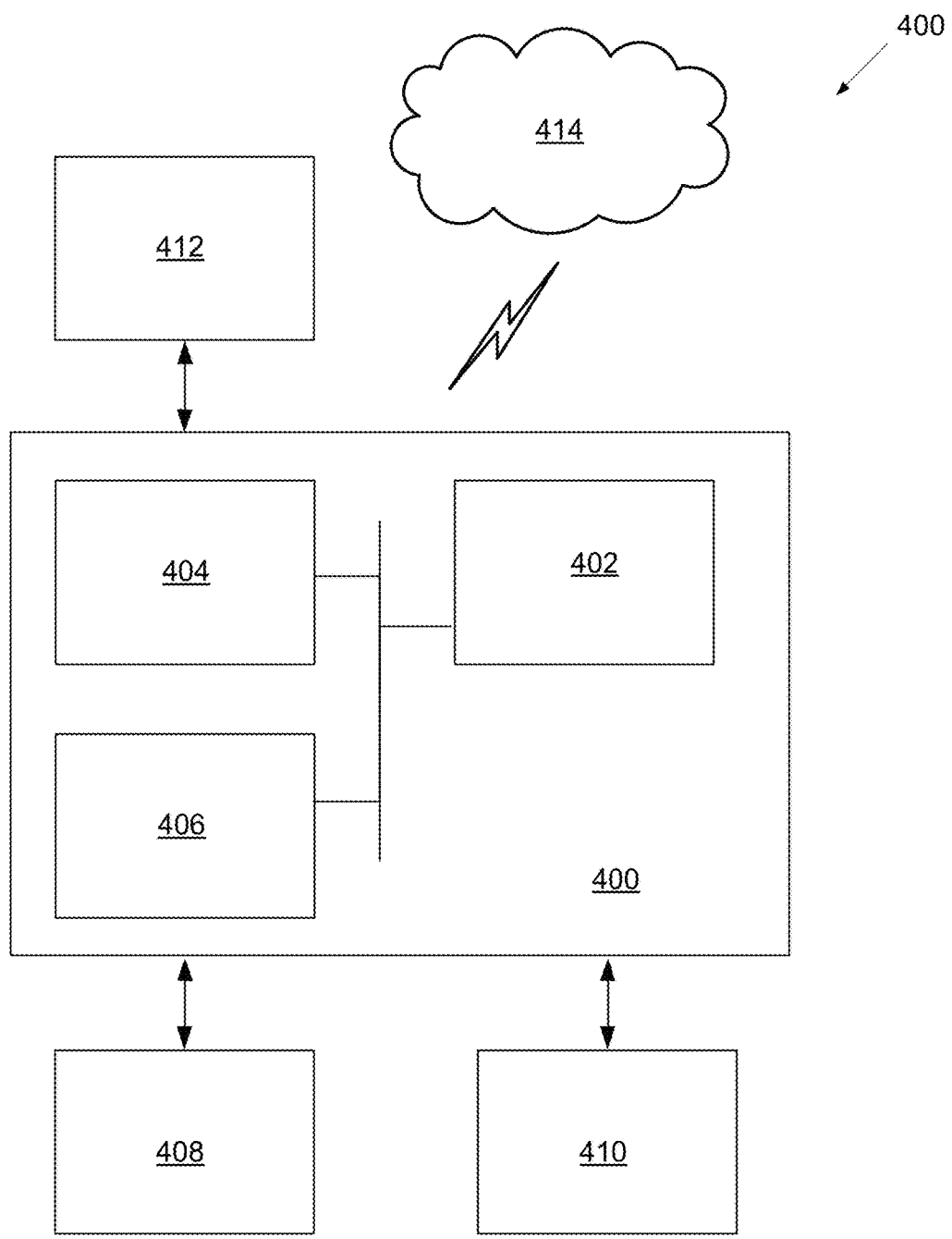
FIG. 4 shows a computing system according to aspects of the invention.

Embodiments of the invention may be implemented on virtually any type of computer regardless of the platform being used. For example, as shown in FIG. 4, a computing system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computing system (400) may be connected to a network (414) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computing system (400) includes at least the minimal processing, input, and/or output means necessary to practice embodiments of the invention.

Further, those skilled in the art will appreciate that one or more elements of the aforementioned computing system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for using a user device, comprising:
   obtaining, during a fingerprint learning phase, a historical portion of user activity data associated with user activity of a user using the user device, wherein the user activity data includes both network traffic data associated with the user device and physical activity data associated with the user device, wherein the network traffic data corresponds to network traffic flows associated with a plurality of users;
   analyzing, by a computer processor of the user device, the historical portion to generate a fingerprint of the user, wherein the fingerprint represents characteristics of the user activity, wherein the analyzing is performed by a user activity analyzer, the user activity analyzer being configured to perform traffic attribution and block correlation, wherein traffic attribution identifies the user that generated the traffic by comparing user identifiers found in the traffic with the user identifiers (user IDs) that are readily known to be associated to the given user, and wherein block correlation identifies which different user IDs correspond to the same user, wherein generating the fingerprint of the user comprises analyzing the plurality of features to determine a uniqueness measure, the uniqueness measure indicating how specific a feature is to the user, wherein the uniqueness measure is calculated using the following formula: uniqueness=$1-((U_{fx}-1)/U_{all})$, where $U_{all}$ represents the number of distinct users identified in the plurality of users and $U_{fx}$ represents the number of users having the feature;
   obtaining, during a fingerprint matching phase subsequent to the fingerprint learning phase, an ongoing portion of the user activity data associated with the user activity of the user using the user device;
   analyzing, by the computer processor and based on the fingerprint, the ongoing portion to determine a match, wherein the match is determined at a time point within the fingerprint matching phase; and
   unlocking, by the computer processor and in response to determining the match, a locked data item for access, the locked data item comprising an authentication credential of the user used to authenticate the user of the device, wherein after determining the match, the authentication credential is automatically accessed by an authentication module to allow the user to access the locked data item, wherein the locked data item is stored on the user device.

2. The method of claim 1,
   wherein, upon unlocking the locked data item, the unlocked data item is subsequently used to authenticate the user.

3. The method of claim 1,
   wherein the network traffic data comprises at least one selected from a group consisting of Internet browsing data, email data, and network application deployment data, and
   wherein the physical activity data comprises at least one selected from a group consisting of acceleration data, geo-location data, audio data, and biometric data.

4. The method of claim 1, further comprising:
   extracting a plurality of features from the historical portion,
   wherein generating the fingerprint of the user comprises analyzing the plurality of features to determine a persistence measure of each feature of the plurality of features.

5. The method of claim 4,
   wherein the plurality of features comprises at least one selected from a group consisting of a user identifier, a domain name of an accessed server, a universal resource locator (URL) of an accessed web service, a network application identifier, a geo-location report, a point-of-interest (POI) name, an online social network (OSN) identifier, and an OSN message.

6. The method of claim 5,
   wherein the plurality of features comprises statistical features, and
   wherein the uniqueness measure and the persistence measure comprises a statistical uniqueness measure and a statistical persistence measure.

7. The method of claim 1, further comprising:
   obtaining, during the fingerprint matching phase subsequent to the fingerprint learning phase, another user activity data associated with another user activity of another user using the user device;
   analyzing, by the computer processor and based on the fingerprint, the another user activity data to determine a mismatch, wherein the mismatch is determined at a time point within the fingerprint matching phase; and
   preventing, by the computer processor and in response to determining the mismatch, the locked data item from any access initiated by the another user.

8. A user device of a user, comprising:
   a processor and memory;
   a user activity data acquisition module comprising instructions stored in the memory, when executed on the processor having functionality to:
      obtain, during a fingerprint learning phase, a historical portion of user activity data associated with user activity of the user using the user device, wherein the user activity data includes both network traffic data associated with the user device and physical activity data associated with the user device, wherein the network traffic data corresponds to network traffic flows associated with a plurality of users; and obtain, during a fingerprint matching phase subsequent to the fingerprint learning phase, an ongoing portion of the user activity data associated with the user activity of the user using the user device;

a user activity analyzer comprising instructions stored in the memory, when executed on the processor having functionality to:

analyze the historical portion to generate a fingerprint of the user, wherein the fingerprint represents characteristics of the user activity, wherein generating the fingerprint of the user comprises analyzing the plurality of features to determine a uniqueness measure, the uniqueness measure indicating how specific a feature is to the user, wherein the uniqueness measure is calculated using the following formula: uniqueness=$1-((U_{fx}-1)/U_{all})$, where $U_{all}$ represents the number of distinct users identified in the plurality of users and $U_{fx}$ represents the number of users having the feature; and analyze, based on the fingerprint, the ongoing portion to determine a match, wherein the match is determined at a time point within the fingerprint matching phase, wherein the user activity analyzer is configured to perform traffic attribution and block correlation, wherein traffic attribution identifies the user that generated the traffic by comparing user identifiers found in the traffic with the user identifiers (user IDs) that are readily known to be associated to the given user, and wherein block correlation identifies which different user IDs correspond to the same user;

an authentication module comprising instructions stored in the memory, when executed on the processor having functionality to:

unlock, in response to determining the match, a locked data item for access, the locked data item comprising an authentication credential of the user used to authenticate the user of the device, wherein after determining the match, the authentication credential is automatically accessed by the authentication module to allow the user to access the locked data item, wherein the locked data item is stored on the user device; and a repository for storing the user activity data, the fingerprint, and the locked data item.

9. The system of claim 8,
wherein, upon unlocking the locked data item, the unlocked data item is subsequently used to authenticate the user.

10. The system of claim 9, further comprising:
a global positioning service (GPS) module and at least one sensor that are configured to generate the physical activity data,
wherein the network traffic data comprises at least one selected from a group consisting of Internet browsing data, email data, and network application deployment data, and
wherein the physical activity data comprises at least one selected from a group consisting of acceleration data, geo-location data, audio data, video data, and biometric data.

11. The system of claim 8, wherein the user activity analyzer further comprises instructions stored in the memory, when executed on the processor further having functionality to:
extract a plurality of features from the historical portion, wherein generating the fingerprint of the user comprises analyzing the plurality of features to determine a persistence measure of each feature of the plurality of features.

12. The system of claim 11,
wherein the plurality of features comprises at least one selected from a group consisting of a user identifier, a domain name of an accessed server, a universal resource locator (URL) of an accessed web service, a network application identifier, a geo-location report, a point-of-interest (POI) name, an online social network (OSN) identifier, and an OSN message.

13. The system of claim 12,
wherein the plurality of features comprises statistical features, and
wherein the uniqueness measure and the persistence measure comprises a statistical uniqueness measure and a statistical persistence measure.

14. The system of claim 8,
wherein the user activity data acquisition module further comprises instructions stored in the memory, when executed on the processor further having functionality to obtain, during the fingerprint matching phase subsequent to the fingerprint learning phase, another user activity data associated with another user activity of another user using the user device,
wherein the user activity analyzer further comprises instructions stored in the memory, when executed on the processor further having functionality to analyze, based on the fingerprint, the another user activity data to determine a mismatch, wherein the mismatch is determined at a time point within the fingerprint matching phase, and
wherein the authentication module further comprises instructions stored in the memory, when executed on the processor having functionality to prevent, in response to determining the mismatch, the locked data item from any access initiated by the another user.

15. A non-transitory computer readable medium embodying instructions for a user device, the instructions when executed by a processor of the user device, comprising functionality for:
obtaining, during a fingerprint learning phase, a historical portion of user activity data associated with user activity of a user using the user device, wherein the user activity data includes both network traffic data associated with the user device and physical activity data associated with the user device, wherein the network traffic data corresponds to network traffic flows associated with a plurality of users;
analyzing the historical portion to generate a fingerprint of the user, wherein the fingerprint represents characteristics of the user activity, wherein the analyzing is performed by a user activity analyzer, the user activity analyzer being configured to perform traffic attribution and block correlation, wherein traffic attribution identifies the user that generated the traffic by comparing user identifiers found in the traffic with the user identifiers (user IDs) that are readily known to be associated to the given user, and wherein block correlation identifies which different user IDs correspond to the same user, wherein generating the fingerprint of the user comprises analyzing the plurality of features to determine a uniqueness measure, the uniqueness measure indicating how specific a feature is to the user, wherein the uniqueness measure is calculated using the following formula: uniqueness=$1-((U_{fx}-1)/U_{all})$, where $U_{all}$ represents the number of distinct users identified in the plurality of users and $U_{fx}$ represents the number of users having the feature;

obtaining, during a fingerprint matching phase subsequent to the fingerprint learning phase, an ongoing portion of the user activity data;

analyzing, based on the fingerprint, the ongoing portion to determine a match, wherein the match is determined at a time point within the fingerprint matching phase; and unlocking, in response to determining the match, a locked data item for access, the locked data item comprising an authentication credential of the user used to authenticate the user of the device, wherein after determining the match, the authentication credential is automatically accessed by an authentication module to allow the user to access the locked data item, wherein the locked data item is stored on the user device.

16. The non-transitory computer readable medium of claim 15, wherein, upon unlocking the locked data item, the unlocked data item is subsequently used to authenticate the user, wherein the network traffic data comprises at least one selected from a group consisting of Internet browsing data, email data, and network application deployment data, and wherein the physical activity data comprises at least one selected from a group consisting of acceleration data, geo-location data, audio data, video data, and biometric data.

17. The non-transitory computer readable medium of claim 15, the instructions when executed by the processor, of the user device, further comprising functionality for:

extracting a plurality of features from the historical portion, wherein generating the fingerprint of the user comprises analyzing the plurality of features to determine a persistence measure of the user activity of the user.

18. The non-transitory computer readable medium of claim 17, wherein the plurality of features comprises at least one selected from a group consisting of a user identifier, a domain name of an accessed server, a universal resource locator (URL) of an accessed web service, a network application identifier, a geo-location report, a point-of-interest (POI) name, an online social network (OSN) identifier, and an OSN message.

19. The non-transitory computer readable medium of claim 18, wherein the plurality of features comprises statistical features, and wherein the uniqueness measure and the persistence measure comprises a statistical uniqueness measure and a statistical persistence measure.

20. The non-transitory computer readable medium of claim 15, the instructions when executed by the processor of the user device, further comprising functionality for:

obtaining, during the fingerprint matching phase subsequent to the fingerprint learning phase, another user activity data associated with another user activity of another user using the user device;

analyzing, based on the fingerprint, the another user activity data to determine a mismatch, wherein the mismatch is determined at a time point within the fingerprint matching phase; and preventing, in response to determining the mismatch, the locked data item from any access initiated by the another user.

* * * * *